United States Patent
Sit et al.

(10) Patent No.: US 11,825,849 B2
(45) Date of Patent: Nov. 28, 2023

(54) METHODS AND COMPOSITIONS FOR INCREASING PLANT GROWTH USING A BIOCHAR-MICROBIAL COMPOSITE

(71) Applicant: Saint Mary's University, Halifax (CA)

(72) Inventors: Clarissa Sit, Halifax (CA); Kaitlyn Blatt-Janmaat, Fredericton (CA); Cassie Burns, Halifax (CA); Nicola Augustin, Halifax (CA)

(73) Assignee: SAINT MARY'S UNIVERSITY, Halifax (CA)

( * ) Notice: Subject to any disclaimer, the term of this patent is extended or adjusted under 35 U.S.C. 154(b) by 6 days.

(21) Appl. No.: 17/581,255

(22) Filed: Jan. 21, 2022

(65) Prior Publication Data
US 2022/0232836 A1    Jul. 28, 2022

Related U.S. Application Data

(60) Provisional application No. 63/140,056, filed on Jan. 21, 2021.

(51) Int. Cl.
*A01N 63/20*    (2020.01)
*A01N 63/30*    (2020.01)

(52) U.S. Cl.
CPC ............. *A01N 63/30* (2020.01); *A01N 63/20* (2020.01)

(58) Field of Classification Search
None
See application file for complete search history.

(56) References Cited

PUBLICATIONS

Blatt-Janmaat et al. Rhizosphere, Mar. 2020, vol. 13, pp. 100184 (Year: 2020).*
Agegnehu G, et al, "The role of biochar and biochar-compost in improving soil quality and crop performance: A review", Appl Soil Ecol. 2017;119:156-170.
Alonso EB, et al, "Culture and food security ", Glob Food Sec. 2018;17:113-127.
Battini et al. "Multifunctionality and diversity of culturable bacterial communities strictly associated with spores of the plant beneficial symbiont Rhizophagus intraradices", Microbiol Res. 2016;183:68-79.
Bennett E, et al, "Manipulating resource allocation in plants", J Exp Bot. 2012;63(9):3391-3400.
Campbell et al, "Reducing risks to food security from climate change", Glob Food Sec. 2016;11:34 43.
Delmer D et al, "Agriculture in the developing world: Connecting innovations in plant research to downstream applications", PNAS. 2005;102(44):15739-15746.
FAO. Food Security. Policy Brief. 2006;2. http://www.fao.org/fileadmin/templates/faoitaly/documents/pdf/pdf_Food_Security_Cocept_Note.pdf.
Fuss et al. "Global food security & adaptation under crop yield volatility. Technol Forecast Soc Change", 2018;98:223-233.
Gamiz et al. "Assessing the effect of organoclays and biochar on the fate of abscisic acid in soil", J Agric Food Chem. 2017;65:29-38.
Gatehouse et al, "Insect-resistant biotech crops and their impacts on beneficial arthropods", Philos Trans R Soc Lond B Biol Sci. 2011;366(1569):1438-1452.
Geisseler D et al, "Long-term effects of mineral fertilizers on soil microorganisms—A review", Soil Biol Biochem. 2014;75:54-63.
Han et al, "Characterization of a novel plant growth-promoting bacteria strain Delftia tsuruhatenesis HR4 both and a diazotroph and a potential biocontrol agent against various plant pathogens", Syst Appl Microbiol. 2005;28(1):66-76.
He et al, "Particle size dependence of the physicochemical properties of biochar", Chemosphere. 2018:212:385-392.
Jiao et al, "Environmental risks of trace elements associated with long-term phosphate fertilizers applications: A review", Environ Pollut. 2012;168:44-53.
Kidd PS et al, "Why plants grow poorly on very acid soils: are ecologists missing the obvious?", J Exp Bot. 2001;52(357):791-799.
Kumar A et al, "Does plant-microbe interaction confer stress tolerance in plants: A review?", Microbial Res. 2018;207:41-52.
Liao, W et al, "Biochar Particle Size and Post-Pyrolysis Mechanical Processing Affect Soil pH, Water Retention Capacity, and Plant Performance", Soil Syst. 2019:3(1):14.
Liu et al, "Genotypic difference in the influence of aluminum and low pH on ion flux, rhizopheric pH and ATPase activity between Tibetan wild and cultivated barley", Environ Exp Bot. 2018;156:16-24.
Megali L et al "Soil microbial inoculation increases corn yield and insect attack", Agron Sustainable Dev. 2015;35(4):1511-1519.
Morgan JAW et al, "Biological costs and benefits to plant-microbe interactions in the rhizosphere", J Exp Bot. 2005;56(417):1729-1739.
Pathan AK et al, "Sample preparation for SEM of plant surfaces", Materials Today. 2010;12:32-43.
Patten CL et al, "Bacterial biosynthesis of indole-3-acetic acid", Can J Microbiol. 1996;42:207-220.
Prosekov AY et al, "Food security□: The challenge of the present", Geoforum. 2018;91: 73-77.
Qambrani et al, "Biochar properties and eco-friendly applications for climate change mitigation, waste management, and wastewater treatment: A review", Renew Sust Energ Rev. 2017;79:255-273.
Ramakrishna et al, "Plant growth promoting bacteria in agriculture: Two sides of a coin", Appl Soil Ecol. 2019:138:10-18.
Rehman et al, "Contrasting effects of biochar, compost and farm manure on alleviation of nickel toxicity in maize (*Zea mays* L.) in relation to plant growth , photosynthesis and metal uptake", Ecotoxicol Environ Saf. 2016;133:218-225.

(Continued)

*Primary Examiner* — Alton N Pryor
(74) *Attorney, Agent, or Firm* — Bereskin & Parr LLP/S.E.N.C.R.L., s.r.l.; Ainslie Parsons

(57) ABSTRACT

Provided is an isolated bacterial strain of the genus *Fictibacillus*, a composition comprising the isolated bacterial strain and an inoculum carrier such as biochar, a method of increasing growth and/or pest resistance of a plant comprising inoculating a plant with the aforementioned strain or composition, and a kit for the use of the above methods and compositions.

20 Claims, 31 Drawing Sheets

(56) References Cited

PUBLICATIONS

Rizwan et al, "Residual effects of biochar on growth, photosynthesis and cadmium uptake in rice (*Oryza sativa* L.) under Cd stress with different water conditions", J Environ Manage. 2018;206:676-683.

Rolli et al, "Root-associated bacteria promote grapevine growth: from the laboratory to the field", Plant Soil. 2017;410(1-2):369-382.

Shanta et al, "Biochar and plant growth promoting rhizobacteria effects on switchgrass (*Panicum virgatum* cv. Cave-in-Rock) for biomass production in southern Quebec depend on soil type and location", Biomass Bioenergy. 2016,95:167-173.

Smith V.H et al, "Eutrophication science: where do we go from here?", Trends Ecol Evol. 2009;24(4):201-207.

Souza R et al, "Plant growth-promoting bacteria as inoculants in agricultural soils", Genet Mol Biol. 2015;38(4):401-419.

Tan et al, "Returning biochar to fields: A review", Appl Soil Ecol. 2017;116:1-11.

Vecstaudza et al, "Wooden biochar as a carrier for endophytic isolates", Rhizosphere. 2017;3:126-127.

Xiong et al, "Enhanced biodegradation of PAHs in historically contaminated soil by M. gilvum inoculated biochar", Chemosphere. 2017;182:316-324.

Yan et al, "Isolation, Diversity, and Growth-Promoting Activities of Endophytic Bacteria From Tea Cultivars of Zijuan and Yunkang-10", Front Micro. 2018, vol. 9, article 1848, pp. 1-11.

Yin et al, "Effect of biochar and Fe-biochar on Cd and as mobility and transfer in soil-rice system. Chemosphere", 2017;186:928-937.

Zhu et al, "Effects and mechanisms of biochar-microbe interactions in soil improvement and pollution remediation: A review," Environ. Pollut. 2017;227:98-115.

Bamdad et al, "Study of surface heterogeneity and nitrogen functionalizing of biochars: Molecular modeling approach", Carbon. 2021; 171:161-170.

Fu, Shih-Feng et al, "Indole-3-acetic acid: A widespread physiological code in interactions of fungi with other organisms." Plant signaling & behavior vol. 10,8 (2015): e1048052. doi:10.1080/15592324.2015.1048052, pp. 1-9.

Berendsen, R. L. et al, "The rhizosphere microbiome and plant health", Trends in plant science, 17(8), 2012, pp. 478-486.

Vessey, J. K. et al, "Plant growth promoting rhizobacteria as biofertilizers", Plant and soil, 255(2), pp. 571-586.

Lehmann, J. et al, "Biochar for environmental management: an introduction", In Biochar for environmental management, pp. 33-46.

Chaney, R. L. et al, "Soil cadmium as a threat to human health", In Cadmium in soils and plants, pp. 219-256.

Lenton, T. M. et al, The radiative forcing potential of different climate geoengineering options. Atmospheric Chemistry and Physics, vol. 9(15), 2009, pp. 5539-5561.

Bréda, N. J. J. "Leaf area index." (2008): 2148-2154.

Augustin, N., "Biofertilizers: Investigating the plant growth-promoting ability and mode of action of a novel PGPR (plant growth promoting rhizobacteria) using biochar as an inoculum carrier", MSc thesis powerpoint presentation, Aug. 10, 2022.

* cited by examiner

METHODS AND COMPOSITIONS FOR INCREASING PLANT GROWTH USING A BIOCHAR-MICROBIAL COMPOSITE

CROSS-REFERENCE TO RELATED APPLICATION

This disclosure claims the benefit of U.S. provisional application No. 63/140,056, filed Jan. 21, 2021, the contents of which are incorporated herein by reference in their entirety.

BIOLOGICAL DEPOSIT

*Fictibacillus enclensis*, a growth promoting bacteria to be used with the compositions and methods of the disclosure, has been deposited with International Depositary Authority of Canada (IDAC), 1015 Arlington Street Winnipeg, Manitoba, Canada, R3E 3R2, under the Accession No. 120121-01 on Jan. 12, 2021.

FIELD

The present disclosure relates to a novel bacterial strain *Fictibacillus enclensis*, a composition comprising *Fictibacillus enclensis* and an inoculum carrier such as biochar, and methods of inoculating plants with the strain or the composition to increase plant growth.

BACKGROUND

The prevalence of food insecurity, even in the developed world, is an issue that has plagued scientists and policy makers alike for decades. Many factors affect the ability to solve this problem, such as the cultural heritages involved, the physical constraints of the crops themselves, and the uncertainty of future environmental conditions due to climate change (Prosekov and Ivanova, 2018; Alonso et al., 2018; Fuss et al., 2018; Campbell et al., 2016). The current definition of food security in the Food and Agricultural Organization of the United Nations (FAO) focuses on four different areas: food availability, food access, utilization, and stability (FAO, 2006).

In an effort to improve food availability, many different methods have been developed to enhance all aspects of crop growth. Decreased growth times, increased overall yields, and resistance to common stressors have all been utilized as a means to improve agriculture (Megali et al., 2015). To reach these goals, techniques such as genetic modification and intensive fertilization are frequently implemented. While some of these techniques have yielded spectacular results, drawbacks are associated with their misuse and overuse. Utilization of modified crops has been implicated in impacting non-target organisms (although further research is needed), and over-fertilization has damaged both soils and neighbouring aquatic ecosystems (Gatehouse et al., 2011; Smith and Schindler, 2009; Geisseler and Scow, 2014; Jiao et al., 2012). Additionally, these approaches may not be practically available or may be too expensive, resulting in a disconnect between technique development and implementation (Delmer, 2005). From these observations, a clear need can be determined: crop enhancement options that are easy to utilize, inexpensive, and not detrimental to the longevity of the ecosystem.

Biochar, a pyrolysis product of carbon heavy biomass, is a fairly accessible option that has historically been utilized to increase plant growth (Tan et al. 2017). Biochar has historically demonstrated significant increases in plant growth through stimulation of the soil ecosystem, showing great potential as an economic and cost effective soil improvement method. Pyrolysis of waste materials yields a porous scaffold with a high surface area that has demonstrated increased water retention, cationic exchange capacity, and carbon sequestration (Agegnehu et al., 2017). Several attempts at utilizing biochar as a remediation method for nutrient depleted soils have been recently reported, demonstrating the efficacy of the material as a carbon and nutrient sink (Yin et al., 2017; Qambrani et al., 2017; Rizwan et al., 2018; Rehman et al., 2016). Another reason proposed for enhanced soil viability via biochar addition is an increase in soil microbial activity (Zhu et al., 2017). Increasing the soil microbial activity has several implications for plant growth, as microbe-plant interactions are hugely important for plant health. Growth promotion, pest resistance, and stress tolerance are just some of the benefits of a healthy soil microbial community (Morgan et al., 2005; Kumar and Verma, 2018). These microbes can assist in plant growth through numerous mechanisms such as assisting in nutrient sequestration, stimulating plant hormone production, or serving as a biocontrol for phytopathogens (Ramakrishna et al., 2019). In an effort to harness the ability of the biochar to act as a microbial vehicle, inoculation of the material has been attempted as a way to control the changes in the microbial ecosystem. For instance, *Mycobacterium gilvum* was cultured in rice biochar and utilized to enhance the degradation of polycyclic aromatic hydrocarbons in contaminated soil (Xiong et al., 2017). In another study, barley growth was enhanced by introducing plant growth promoting microbes (Vecstaudza et al., 2017).

Novel compositions and methods for increasing plant growth and/or increasing pest resistance in plants are desirable.

SUMMARY

A novel strain of bacteria from the genus *Fictibacillus*, *Fictibacillus enclensis*, was identified by the inventors. Inoculating plants with a biochar-*Fictibacillus enclensis* composition was shown to enhance growth and increase pest resistance in plants.

Accordingly, a first aspect of the invention is an isolated bacterial strain of the genus *Fictibacillus* having IDAC Accession number 120121-01.

Another aspect of the invention is a composition comprising (a) an isolated bacterial strain of the genus *Fictibacillus*, (b) an inoculum carrier and optionally (c) a nutrient medium.

In one embodiment, the inoculum carrier comprises biochar.

In another embodiment, the biochar is coarse biochar.

In another embodiment, the isolated bacterial strain produces Indole-3-acetic acid (IAA). In a further embodiment, the isolated bacterial strain produces siderophores and/or has nitrogen fixing ability.

In another embodiment, the isolated bacterial strain has IDAC Accession number 120121-01.

In another embodiment, the nutrient medium comprises tryptone, sodium chloride and yeast extract.

In another embodiment, the composition further comprises at least one additional isolated bacterial strain with plant growth promoting activity.

Another aspect of the invention is a method of increasing the growth and/or pest resistance of a plant comprising, inoculating the plant with (i) an isolated bacterial strain of the genus *Fictibacillus* having IDAC Accession number 120121-01 or (ii) a composition comprising (a) an isolated bacterial strain of the genus *Fictibacillus*, (b) an inoculum carrier and optionally (c) a nutrient medium, and growing the plant.

In one embodiment, a plant substrate proximate to the plant is inoculated with the isolated bacterial strain or the composition as described herein, thereby inoculating the plant with the isolated bacterial strain of the genus *Fictibacillus* or the composition.

In another embodiment, the plant substrate proximate to the plant is soil.

In another embodiment, the method further comprises inoculating the plant with at least one additional isolated bacterial strain having plant growth promoting activity.

In another embodiment, the increasing plant growth is measured as an increase in one or more of fruit weight, height of plant, height of stalk, fruit yield, ratio of head weight to shoot weight, and increased leaf area, compared to one or more control plants not inoculated with the aforementioned isolated bacterial strain of the genus *Fictibacillus* or the aforementioned composition.

In another embodiment, the pest resistance is measured as a decrease in pest damage as compared to one or more control plants not inoculated with the aforementioned isolated bacterial strain of the genus *Fictibacillus* or the aforementioned composition.

In another embodiment, the plant is a crop plant, optionally a cereal plant.

In another embodiment, the plant is a barley plant.

In another embodiment, the plant is a fruit or vegetable plant.

In another embodiment, the plant is a broccoli, collard greens, carrots, bean, grape vine, strawberry, or blueberry plant.

Another aspect of the invention is a kit comprising a first container comprising an inoculum carrier, optionally biochar, and a second container comprising an isolated bacterial strain of the genus *Fictibacillus*.

In one embodiment, the isolated bacterial strain of the genus *Fictibacillus* produces Indole-3-acetic acid, produces siderophores and/or has nitrogen fixing ability.

In another embodiment, the isolated bacterial strain has IDAC Accession number 120121-01.

In another embodiment, the kit further comprises a third container comprising a nutrient medium.

In another embodiment, the kit further comprises an additional container comprising at least one additional isolated bacterial strain with plant growth promoting activity.

In another embodiment, the kit comprises a further container comprising a soil.

A further aspect of the invention is the use of the aforementioned strain, composition or kit to inoculate a plant.

A further aspect of the invention is plant or plant inoculated with the aforementioned strain.

In one embodiment, the plant is a barley, carrot, collard greens, bean, broccoli, strawberry, or blueberry plant.

In another embodiment, the plant is inoculated using the aforementioned methods.

Other features and advantages of the present disclosure will become apparent from the following detailed description. It should be understood, however, that the detailed description and the specific examples while indicating preferred embodiments of the disclosure are given by way of illustration only, since various changes and modifications within the spirit and scope of the disclosure will become apparent to those skilled in the art from this detailed description.

BRIEF DESCRIPTION OF THE DRAWINGS

An embodiment of the present disclosure will now be described in relation to the drawings in which.

DETAILED DESCRIPTION OF THE DISCLOSURE

Figure 1A:
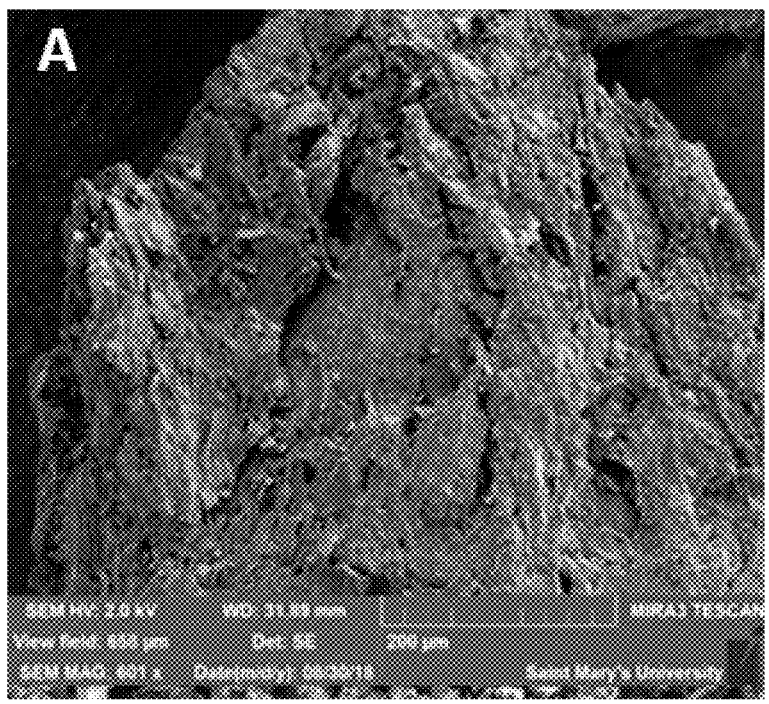
FIG. 1 (A, B) shows coarse biochar (A) compared to fine biochar (B).

Unless otherwise defined, scientific and technical terms used in connection with the present disclosure shall have the meanings that are commonly understood by those of ordinary skill in the art. Further, unless otherwise required by context, singular terms shall include pluralities and plural terms shall include the singular. For example, the term "a cell" includes a single cell as well as a plurality or population of cells. Generally, nomenclatures utilized in connection with, and techniques of, cell and tissue culture, molecular biology, and protein and oligonucleotide or polynucleotide chemistry and hybridization described herein are those well-known and commonly used in the art (see, e.g. Green and Sambrook, 2012).

As used herein, the term "inoculate" and variants thereof refer to contacting a plant or plant substrate with a composition, for example, mixing a composition into a plant substrate, such as soil, or coating the plant seed or roots of a plant seedling in a composition.

As used herein, the term "plant" refers to a plant at any stage in its lifecycle, for example, a mature plant, a seedling, a plant seed, a germplasm, etc and includes plant propagating material. Plant propagating material refer to any part of a plant from which another plant can be produced.

As used herein, the term "inoculum carrier" refers to a material that helps to deliver a suitable amount of an inoculant, for example a growth promoting bacterial strain, in good physiological condition to a plant or plant substrate. For example, an inoculum carrier may be used to deliver the bacteria to the site of the plant and to keep it in that vicinity/prevent the bacteria from washing away or diluting into the ground water. Examples of suitable carriers include organic materials such as peat, coal, clay, saw dust, wheat bran, peat supplemented with chitin-containing materials, and inorganic materials such as vermiculite, perlite, silicates, kaolin, and bentonite. In one embodiment of the present disclosure, the inoculum carrier is or comprises biochar.

As used herein, the term "biochar" refers to a pyrolysis product of carbon heavy biomass and includes all kinds of biochar, for example, coarse biochar or fine biochar.

As used herein, the term "plant substrate proximate to the plant" refers to a substance that contacts a plant, which the plant uses during its growth, for example, soil, sand, solutions etc.

As used herein, the term "nutrient medium" refers to a formulation that supports the growth of a bacterial strain and/or delivery of a biochar-microbial composite to a plant or plant substrate, for example nutrient broth comprising tryptone, sodium chloride, and yeast extract.

As used in this specification and the appended claims, the singular forms "a", "an" and "the" include plural references unless the content clearly dictates otherwise. Thus for example, a composition containing "a compound" includes a mixture of two or more compounds. It should also be noted that the term "or" is generally employed in its sense including "and/or" unless the content clearly dictates otherwise.

As used in this application and claim(s), the word "consisting" and its derivatives, are intended to be close ended terms that specify the presence of stated features, elements, components, groups, integers, and/or steps, and also exclude the presence of other unstated features, elements, components, groups, integers and/or steps.

The terms "about", "substantially" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The definitions and embodiments described in particular sections are intended to be applicable to other embodiments herein described for which they are suitable as would be understood by a person skilled in the art.

The recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about".

Further, the definitions and embodiments described in particular sections are intended to be applicable to other embodiments herein described for which they are suitable as would be understood by a person skilled in the art. For example, in the following passages, different aspects of the disclosure are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

A first aspect of the invention is an isolated strain of bacteria useful for increasing plant growth and/or increasing pest resistance in plants. In one embodiment, the isolated bacteria strain is of the genus *Fictibacillus*. In another embodiment, the strain is bacteria strain *Fictibacillus enclensis* (also referred to herein as *F. enclensis*) deposited with International Depository Authority of Canada (IDAC), 1015 Arlington Street Winnipeg, Manitoba, Canada, R3E 3R2, under the Accession No. 120121-01 on Jan. 12, 2021. In one embodiment, the bacterial strain *Fictibacillus enclensis* is in the form of a freeze-dried powder.

Another aspect of the invention is a composition comprising an inoculum carrier, an isolated strain of the *Fictibacillus* genus, and optionally a nutrient medium. Where the inoculum carrier is biochar, such a composition is also referred to herein as a "biochar-microbial composite".

In one embodiment, the isolated strain of the *Fictibacillus* genus is a strain with plant-growth promoting activity. As used herein, the expression "plant-growth promoting activity" refers to the ability of the strain to increase plant growth as defined herein. *Fictibacillus enclensis* is an example of a strain with plant-growth promoting activity. As shown here, *Fictibacillus enclensis* produces the plant growth promoting hormone indole-3-acetic acid (IAA). In another embodiment the isolated strain of the *Fictibacillus* genus is a strain that produces indole-3-acetic acid. Production of IAA may be determined, for example, according to the method set out in Example 3.

As shown here, *Fictibacillus enclensis* may also produce siderophores. In another embodiment, the isolated strain of the *Fictibacillus* genus is a strain that produces siderophores. Production of siderophores may be determined, for example, according to the Blue Agar CAS Assay for Siderophore Detection set out in Example 3.

Further, as shown here, *Fictibacillus enclensis* may also have the ability to fix nitrogen. Accordingly, in another embodiment, the isolated strain of the *Fictibacillus* genus is a strain that has nitrogen-fixation ability. The ability of a bacterial strain to fix nitrogen may be determined by any means known in the art, including for example, the method set out in Example 3.

In another embodiment, the isolated strain is *Fictibacillus enclensis* deposited with International Depository Authority of Canada (IDAC), 1015 Arlington Street Winnipeg, Manitoba, Canada, R3E 3R2, under the Accession No. 120121-01 on Jan. 21, 2021. In a further embodiment, the isolated strain in the composition is in an effective amount to inoculate a plant or plant substrate.

In another embodiment, a 10 mL starter culture of the isolated strain with an optical density (measured at 600 nm) of 0.25 is sufficient to formulate enough of the composition to treat eight half liter pots of soil or eight seedlings planted in an open field.

In one embodiment, the inoculum carrier is biochar. In a further embodiment, the biochar is coarse biochar. In one embodiment, coarse biochar is biochar with particles having an average diameter of greater than 150 µM. In contrast, fine biochar with particles having an average diameter of greater than 150 µM. Methods of preparing biochar are well known in the art. In one embodiment, the biochar may be prepared by anaerobic pyrolysis of debarked hard wood at ca. 400° C. for 30 min followed by rapid quenching in cold water. In addition, biochar, including coarse and fine biochar, may be obtained from commercial sources. In another embodiment, the volume of biochar in the composition is equal or approximately equal to the volume of the nutrient medium in the composition. In another embodiment, the ratio of biochar in the composition to the volume of nutrient medium is or is approximately 0.5:1, 0.75:1. 1:1, 1:1.25 or 1:1.5.

The nutrient medium (also referred to here as "nutrient broth") is a medium that contains nutrients to supports the growth of the isolated bacteria and/or the plant. In one embodiment, the nutrient medium comprises tryptone, sodium chloride, and yeast extract, for example, 5 g tryptone, 5 g sodium chloride and 3 g of yeast extract per 1 L of water. A person of skill in the art could readily be able to identify other types of nutrient medium useful for the present composition.

In another embodiment, the composition further comprises at least one additional bacterial strain with plant growth promoting activity (i.e., a strain that increases plant growth) and/or that increases pest resistance. In one embodiment, the least one additional bacterial strain is an endophyte. In another embodiment, the at least one additional bacterial strain is a strain from the *Fictibacillus* genus.

In another embodiment, the composition further comprises at least one additional substance that increases plant growth and/or increases pest resistance.

In a further embodiment, the composition is made using the methods in the Examples. For example, the composition may be made by mixing the biochar with the nutrient broth and then sterilizing it, for example in an autoclave. Cells of the bacterial strain are then mixed with a volume of the nutrient broth and allowed to incubate at room temperature. The cells are then added to the biochar/nutrient broth mixture and the entire mixture is then incubated, for example at 30° C., 100 rpm for 24 hours, to form the biochar-microbial composition.

Another aspect of the invention is a method of increasing growth and/or pest resistance of a plant comprising, inoculating a plant with the composition comprising an inoculum carrier such as biochar, an isolated strain of the *Fictibacillus* genus, optionally *F. enclensis*, and optionally a nutrient medium, and growing the plant.

Another aspect of the invention is a method of increasing growth and/or pest resistance of a plant comprising, inoculating a plant with *F. enclensis*, and growing the plant.

In a further embodiment, the plant is inoculated by contacting the plant or plant substrate proximate to the plant with *F. enclensis* or with the composition.

In a further embodiment, the plant is contacted with *F. enclensis* or with the composition. In a further embodiment, the plant substrate is contacted with *F. enclensis* or with the composition. In a further embodiment, the plant substrate is the soil surrounding the root or seed of the plant. In further embodiment, the plant substrate is the soil surface surrounding the plant. In a further embodiment, the plant is a seed, seedling or other plant propagating material. In another embodiment, the plant substrate is liquid media or solid agar media in which a seedling is growing. For example, a seedling may be started in a lab in liquid media or on solid agar medium (also known as petri dish seedlings), where the liquid media or on solid agar medium is contacted with *F. enclensis* or with the composition, and then the seeding are transplanted to soil, which may be treated or untreated, afterwards. In another embodiment, the plant seed or the seedling's roots are contacted with *F. enclensis* or with the composition. In another embodiment, the plant or plant substrate is inoculated more than once with *F. enclensis* or with the composition. For example, the plant or plant substrate may be inoculated more than once with *F. enclensis* or with the composition once every week, once every 10 days, once every two weeks or once every 3 weeks.

In a further embodiment, increasing plant growth is measured as an increase in one or more of fruit weight, ratio of fruit weight to shoot length, leaf area, plant height, stalk height, stalk width, shoot length, shoot weight, fruit yield or ratio of head weight to shoot weight, compared to one or more control plants not inoculated with the aforementioned composition. In a further embodiment, increasing plant growth is measured as an increase in crop yield. In another embodiment, increasing plant growth is measured by an increase in nutritional value of the plant, for example an increase in vitamin C content, nitrogen content and/or other nutrients and minerals. In another embodiment, increasing plant growth is measured by an increase in production of medically active molecules (for example anti-inflammatories). In another embodiment, at least one of the aforementioned measures of plant growth are increased by at least 5, 10, 15, 25, 50, 75 or 100% compared to one or more control plants not inoculated with the aforementioned strain or composition.

In another embodiment, an increase in pest resistance is measured as a decrease in pest damage as compared to one or more control plants not inoculated with the aforementioned strain or composition. Pest damage can be measured for example by the area or proportion of a plant part (such as a plant leaf) that is negatively affected by the pest. As used herein, the term "pest" refers to any organism detrimental to the health and/or growth of a plant. For example, the pest is optionally an insect or microorganism.

In a further embodiment, the control plant is inoculated with a composition consisting of a carrier such as biochar and optionally a nutrient medium. In a further embodiment, the biochar is coarse biochar. In another embodiment, the control plant is inoculated with any composition. The control plant is optionally a plant of the same species as the plant of interest.

In a further embodiment, the method comprises one or more of the steps described in the Examples.

In a further embodiment, the plant is a crop plant, optionally a cereal plant. In another embodiment, the plant is a barley plant.

In a further embodiment, the plant is a fruit or vegetable plant. In another embodiment, the plant is a broccoli, carrot, collard greens, bean, turnip, strawberry, or blueberry plant. In another embodiment, the plant is a grape vine.

In another embodiment, the plant is an ornamental flower. In another embodiment, the plant is *Echinacea*.

In one embodiment, a barley plant inoculated with a composition as described herein has an increase in fruit weight of at least or about 5%, at least or about 9% or at least or about 13% compared to one or more control plants not inoculated with the composition.

In another embodiment, a barley plant inoculated with a composition as described herein has an increase in fruit yield of at least or about 50% or at least or about 54% compared to one or more control plants not inoculated with the composition.

In one embodiment, a broccoli plant inoculated with a composition as described herein has an increase in the ratio of head weight to shoot weight at least or about 30% or at least or about 37% compared to one or more control plants not inoculated with the composition.

Another aspect of the invention is a kit comprising a first container comprising an inoculum carrier, optionally biochar, wherein the biochar is optionally coarse biochar, a second container comprising an isolated strain of the *Fictibacillus* genus, optionally *F. enclensis*, and optionally a third container comprising a nutrient medium. In another embodiment, the kit further comprises an additional container comprising a soil. In another embodiment, the kit further comprises an additional container comprising an additional bacterial strain with plant growth promoting activity (i.e., a strain that increases plant growth) and/or that increases pest resistance. In one embodiment, the least one additional bacterial strain is an endophyte. In another embodiment, the at least one additional bacterial strain is a strain from the *Fictibacillus* genus. In one embodiment, the isolated strain of the *Fictibacillus* genus and/or the additional bacterial strain is present as a freeze-dried powder. In another embodiment, the nutrient medium is present as a dried power mixture which may be reconstituted with the addition of a liquid such as water. In another embodiment, the second container comprises an isolated strain of the *Fictibacillus* genus in a freeze-dried form and the third container comprises a liquid nutrient medium. In such as embodiment, the freeze-dried strain may be added directly to the third container for growth of the strain.

A further aspect of the invention is the use of the aforementioned strain, aforementioned composition or the aforementioned kit to inoculate a plant. In a further embodiment, the plant is a crop plant, optionally a cereal plant such as a barley plant. In a further embodiment, the plant is a fruit or vegetable plant, optionally a broccoli, carrot, collard greens, bean, turnip, strawberry, or blueberry plant. In another embodiment, the plant is a grape vine. In another embodiment, the plant is an ornamental flower. In another embodiment, the plant is *Echinacea*.

Also contemplated herein is the use of the aforementioned strain, composition or kit, wherein the plant is inoculated using the aforementioned methods. In a further embodiment, one or more of the methods and compositions described in the Examples are used.

Further contemplated is a plant or part thereof inoculated with the aforementioned bacterial strain. In one embodiment, the plant or plant part inoculated using a method as described herein. For example, the plant may be inoculated by contacting the plant or plant substrate proximate to the plant with *F. enclensis* or with the composition. Optionally, the plant or plant part is stably inoculated with the bacterial strain. As used herein "stably inoculated" means that the plant or plant part remains associated with the bacterial strain for a period of time after inoculation, for example, at least one week, 2 weeks, 4 weeks, 2 months, 3 months or 6 months. The plant part may be, for example, a seed. The inoculated plant or plant part can be cultivated under known techniques.

The above disclosure generally describes the present application. A more complete understanding can be obtained by reference to the following specific examples. These examples are described solely for the purpose of illustration and are not intended to limit the scope of the application. Changes in form and substitution of equivalents are contemplated as circumstances might suggest or render expedient. Although specific terms have been employed herein, such terms are intended in a descriptive sense and not for purposes of limitation.

The following non-limiting examples are illustrative of the present disclosure:

EXAMPLES

Example 1

Bacterial strains were selected after a literature review of a variety of plant growth promoting bacteria and the two char sizes were selected based on availability. To determine if the size of the particulate matter was important for plant growth and bacterial transport, two different chars were utilized as microbial vehicles. This was investigated as previous work has indicated that biochars of different particle sizes possess different properties and impact plant growth in different ways (He et al., 2018; Liao and Thomas, 2019). Successful inoculation was achieved and the impact of the composite on barley yield and soil properties was examined in an attempt to elucidate the nature of the growth enhancement. Two commercially available strains (a *Pseudomonas rhodesiae* strain and a *Delftia tsuruhatenesis* strain) were used for the inoculation. When one batch of coarse biochar control was found to be contaminated, the organism was isolated and identified (a *Fictibacillus* sp.), and its impact on barely yield and soil properties was evaluated as well.

Plant-microbe interactions have been established as an important aspect of plant health. One goal of this study was to develop a plant growth stimulating formulation based on the concept of plant-microbe interactions, as a means of avoiding chemical fertilizers. It was hypothesized that biochar (originally produced out of the desire to repurpose forestry waste) could serve as an effective vehicle for delivering plant-growth promoting bacteria to the rhizosphere of germinating barley. The study was initiated using two commercially available bacterial strains. *Pseudomonas rhodesiae* has been reported to increase vegetative growth when paired with biochar, while *Delftia tsuruhatenesis* has demonstrated promise as a plant growth promoter and biocontrol agent (Shanta et al., 2016; Han et al., 2005). In addition to these two strains, a contaminant was discovered in one batch of the coarse biochar. The contaminant was isolated and identified as belonging to the genus *Fictibacillus* based on 16S rRNA sequencing. *Fictibacillus* sp. have been detected as plant endophytes, suggesting that bacteria belonging to this genus are well tailored for plant-microbe interactions (Yan et al., 2018).

Another component of the formulation is the biochar itself, which serves as a carrier and potentially a reservoir for the plant growth promoting bacteria to be supplemented to the plant rhizosphere. As such, the chemical and physical characteristics of the coarse and fine biochars were analyzed to assess their impact on the soil and to help determine which biochar would serve as a better carrier. The neutral to basic pH reported for both biochars (FBC: 9.42, CBC: 7.84) was consistent with literature relating to biochar characteristics, suggesting that woody feedstocks can produce chars with pH values ranging from mildly acidic (~5) to fairly alkaline (~11) [15]. pH differences based on particle size have also been reported (Liao and Thomas, 2019). The differences in pH due to particle size have previously been attributed to increased ash content, which has the potential to cause a liming effect. Without being bound by theory, it is unlikely that the preparation of the char was responsible for the observed differences, as both chars were prepared with the same pyrolysis conditions. The IR spectrum of the two biochars indicated the presence of O—H stretching (3400 cm−1), C—H2 and C—H3 stretching (2900 cm−1), C=O stretching (1600 cm−1), C=C stretching (1400 cm−1), and C—O stretching (1150 cm−1). These IR vibrational modes are associated with cellulose, hemicellulose, lignin, and conjugated ketones, all of which are plant derived materials that make up the majority of the woody feedstock. Since the pyrolysis was conducted at lower temperatures, most of the features remained intact and detectable by IR spectroscopy. The CHN elemental analysis was also consistent with previously reported compositional data. The analysis indicated that the composition was 87% C, 2.6% H, 0.3% N, 0.1% S, and >1% ash. The remaining percentage is assumed to account for the oxygen content in the biochar because it was not completely carbonized.

Many of the surface features that are attributed to the beneficial properties of the biochar were clearly visualized using SEM. The CBC was composed of significantly larger pieces with more surface detailing compared to the FBC. The layers and larger porous framework of the CBC was similar to SEM images of plant vascular tissue, demonstrating the great impact that feedstock selection has on the physical properties of the char (Bamdad et al., 2021). Differences in physical properties of biochar due to the feedstock and pyrolysis conditions have been previously reported.

Previous work analyzing the impact of biochar as a carrier for microbial cells demonstrated that significant differences in barley shoot length were observed after two weeks of growth (Vecstaudza et al., 2017). However, the authors did not follow the growth past 14 days and were therefore not able to report fruit weights (Vecstaudza et al., 2017). In the current study, only the FBC inoculated with *D. tsuruhatenesis* or *P. rhodesiae* significantly increased the shoot length of the barley, while having no impact on the fruit weight compared to the soil only control. Conversely, the FBC by itself and the CBC inoculated with *P. rhodesiae* significantly increased the fruit weight of the barley while maintaining similar shoot lengths as the control. The CBC inoculated with *Fictibacillus* significantly reduced the shoot length while maintaining the fruit weight. Taken together, the results indicate that CBC inoculated with *Fictibacillus* and FBC by itself stimulated the greatest increase in fruit:shoot ratios in the barley.

Because this study followed the development of the barley for a full nine weeks, the results are more complex than those from the previously reported study (Vecstaudza et al., 2017). In addition, the present results may not fully match the previous findings including differences in the amount of biochar utilized, the bacterial strains, and the method of plant growth. Un-supplemented topsoil was utilized in this study, while others have utilized supplemented loamy soil in previous studies. Without being bound by theory, the lower nutrient content and difference in texture could contribute to the slower growth that was demonstrated in the controls of this study compared to those reported previously.

Contrasting changes in shoot weight and fruit weight were seen in the present study, indicating a shift in the allocation of resources with the different treatments. Altering the resource allocation of crops has been part of selective breeding for many years in an attempt to produce crops with larger fruits, but environmental stimulation can also alter these characteristics (Bennett et al., 2012). Bacterial strains within the soil can influence the allocation through the mobilization of nutrients and production of phytohormones (Souza et al., 2015). The CBC with *Fictibacillus* produced shorter barley with larger fruit, leading to a significantly increased fruit:shoot ratio. FBC with no microbial partner maintained the shoot length while increasing fruit weight, giving rise to an increased fruit:shoot ratio as well. CBC inoculated with *P. rhodesiae* also performed well, but the yield increase was not significant. *P. rhodesiae* produces 1-indole acetic acid, demonstrates 1-aminocyclopropane-1-carboxylate (ACC) deaminase activity, solubilizes phosphorous, and produces siderophores (Rolli et al., 2017). A strain of *Fictibacillus barbaricus* produces a variant of indole acetic acid, produces siderophores, and solubilizes phosphorous; however, it is unknown if that particular strain was identical to the one utilized in this study (Battini et al., 2016). 1-indole acetic acid in particular is a growth hormone that bacteria secrete in order to influence the growth of the plant and, by extension, increase the supply of nutrients within the soil (Patten and Glick, 1996).

Biochar itself has been shown to interact with phytohormones in the soil, potentially altering the bioavailability of the compounds to the plant and affecting plant-microbe signalling (Gamiz et al., 2017). The increased surface area of the FBC could result in bacterial secretions being trapped within the soil and not reaching the plant, thereby dampening the impact of the inoculation. Based on the differences in performance between the FBC control and the CBC control, FBC could be altering the characteristics of the soil more than CBC (see below). The contrasting results may also indicate that CBC supports the growth of beneficial organisms better. It has been argued that differences in microbial loading within the two chars could also account for the differential growth that was observed. FBC has a larger surface area, and therefore the potential to provide more attachment sites for cells. If the cell count was significantly higher within the FBC, competition between the introduced bacteria and the plants could be contributing to the lower growth that was observed in those trials. This hypothesis, however, is contradicted by our findings that inoculated CBC performs better than uninoculated CBC, and the inoculated FBC still increases shoot weight compared to the controls. Soil pH was significantly changed by all FBC treatments and by the CBC *P. rhodesiae* trial. This supports the idea that the FBC produced more drastic changes in soil properties than the CBC due to smaller particle sizes resulting in more contact with the substrate and more ash content which allows for more liming effects (Liao and Thomas, 2019). While no overall trend between growth and pH was observed, increased alkalinity of the soil was detected in one of the three trials that demonstrated significant increases in yield. Biochar with small particle sizes is reported to have improved liming ability and was most likely the cause of the increased pH for those three treatments. For the CBC *P. rhodesiae* trial, it is unclear what caused the pH change, since the optimal pH range for *Pseudomonas rhodesiae* is reported to be 6.8±0.2 (ATCC). Growth of plants are known to be limited by pH, particularly pH values in the acidic range, as the pH changes the solubility of nutrients within the soil (Liu et al., 2018). The growth medium utilized was already basic (pH=8.1) so alkaline stress was expected. However, as barley grows within a neutral pH range and is especially sensitive to acidic conditions, increased growth based on the increased alkalinity of the soil was not anticipated (Liu et al., 2018). Differences in pH tolerance between barley varieties has been documented, so more work to determine the pH preference of the Streaker Naked Barley that was utilized could provide insight into whether or not pH is responsible for at least part of the growth change.

The HANNA soil test kit provided an easy way to analyze general soil characteristics, but no differences were observed between the trials. Differences emerged with absorbance measurements, indicating that the kit is useful for the general gardener. However, more advanced instrumentation is required to determine minor changes. All treatments showed increases compared to the control in terms of nitrogen and phosphorous levels, which was expected as nutrient broth was added to all treatments. The highest nitrogen content was observed in the CBC control, which could be due to the nutrient broth not being depleted by an introduced bacterial strain. The nitrogen in the FBC control was significantly lower, suggesting that the FBC may not transport nutrients as well as the CBC. The difference in pH between the two chars could be playing a role in the nutrient retention, since nutrient solubilisation is impacted by pH. None of the changes observed in terms of soil nutrients were correlated with yield increase, indicating that N and P levels were not responsible for the growth. However, increases in all treatments compared to the control highlight the benefit of the biochar-microbial composite on soil health. Future work could be done to analyze the micronutrients in the soil to further study the impact of the inoculation on the health of the soil.

In conclusion, the properties of the biochar influenced the success of the bacterial inoculation and the subsequent increase in crop yield, supporting the work by Liao and Thomas, 2019. CBC performed better with a bacterial partner while FBC performed worse. Pore and particle size of the material and how these features impacted bacterial adsorption most likely contributed to the yield increase as changes in soil characteristics did not correlate with changing yields. The most successful bacterial treatment was CBC paired with the contaminant *Fictibacillus*. The slow pyrolysis of forest waste material to form the CBC was suspected to be the source of the contamination, as *Fictibacillus* species have been identified as endophytes of certain plants (Yan et al., 2018). What began as a contaminated batch of coarse biochar control, resulted in the isolation of an effective growth promoting bacterium.

Control and experimental pots of barley were grown and monitored in a greenhouse for 9 weeks prior to harvest and analysis of growth traits. In general, yields of barley improved by at least 54% when coarse biochar was inoculated with bacteria (p=0.113), compared to uninoculated coarse biochar or no biochar controls. In contrast, fine biochar performed significantly better without a microbial partner (p=0.028). Significant changes in soil pH were detected (p=0.020–0.068) in some of the treatments correlating with the different pH levels of the respective biochars. While both the fine biochar and the *Fictibacillus*-inoculated coarse biochar gave similarly large increases in fruit:shoot ratios in the barley, it was noted that the fine biochar is more difficult to handle and can pose an inhalation hazard when dry.

Materials and Methods

All media constituents were obtained from Fisher Scientific and chemicals were obtained from Sigma-Aldrich. Fine ground biochar (FBC) and coarse ground biochar (CBC) were graciously provided by the MacQuarrie group at Cape Breton University. Biochar was prepared by the anaerobic pyrolysis of debarked hard wood at ca. 400° C. for 30 min followed by rapid quenching in cold water. The biochar was washed, dried, ground, and sieved to provide fine (<150 μm) and coarse biochar (>150 μm). Bacterial strains *Pseudomonas rhodesiae* (Coroler et al. ATCC® 700311™) and *Delftia tsuruhatenesis* (Shigematsu et al. ATCC® BAA-544™) were obtained from ATCC and cultured using the suggested growth conditions from ATCC. Vigro Premium Garden Soil was obtained from Home Depot (Canada) and Streaker Naked Barley was obtained from Salt Spring Seeds (Salt Spring Island, British Columbia, Canada).

Biochar Characterization

The biochar was characterized by pH, infrared spectroscopy, and CHN elemental analysis. The pH was tested by immersing a VWR symphony probe into a suspension of 0.5 g of biochar in 5 mL of deionized water. Three samples were prepared and each sample was run in triplicate. IR samples were prepared using a KBr pellet and analyzed using a Bruker Alpha Platinum Infrared Spectrometer. Important peaks were picked after the spectrum was smoothed using the provided software. CHN elemental analysis was completed using triplicate samples on a Perkin Elmer 2400 Series II CHN Analyzer. Surface area and textural properties were measured using an ASAP 2020 analyser (Micromeritics, Norcross, GA, USA). Particle size was analyzed using a Fisherbrand USA Standard Test 150 μm sieve (Thermo Fisher Scientific, Waltham, MA, USA).

Biochar Inoculation

The procedure was modified from Xiong et al., 2017. Biochar (500 mL) was mixed with an equal volume of 50% nutrient broth (5 g NaCl, 3 g yeast extract, 5 g tryptone, 1 L water) and sterilized in an autoclave at 121° C. for 30 minutes. The mixture was allowed to cool to room temperature while 200 μL of the bacterial strain of interest (obtained from −20° C. frozen stock) was mixed with 10 mL nutrient broth and allowed to incubate at room temperature for 1 hour. 5 mL of the equilibrated cells were introduced to the biochar and the flask was incubated at 30° C., 100 rpm for 24 hours to form the biochar-microbial composite. The biochar control treatments were prepared using the same method, save for omission of the bacterial partner, to account for any carrier effects. The CBC was easier to work with due to the coarse texture while the FBC was very similar to activated carbon (powdery in consistency and difficult to measure accurately). As such, extra precaution was taken when working with the FBC, as inhalation and potential lung damage was a concern. The char was handled in a fume hood until saturated with nutrient broth in an effort to limit exposure to airborne particulate matter. The FBC was more hydrophobic and required more agitation before an aqueous mixture would form when it was introduced to the nutrient broth.

Scanning Electron Microscopy (SEM)

Samples were prepared for SEM imaging using a procedure modified from Xiong et al., 2017. The sample was suspended in 2.5% glutaraldehyde solution in phosphate buffer solution (pH 7.2) and allowed to fix for 1 hour. The glutaraldehyde was removed and the sample was dehydrated using a series of ethanol solutions (30%, 50%, 70%, 90%, 100%) at 20 minutes per solution. The ethanol was removed and the vial was placed under argon before hexamethyldisilazane (HMDS) was added and allowed to incubate for 5 minutes. The HMDS was removed and the sample was stored in a desiccator for 48 hours to remove any residual water. The sample was mounted on carbon tape and analyzed using a MIRA3 TESCAN Scanning Electron Microscope at 2.0 kV.

Soil Inoculation and Barley Growth

Figure 9:
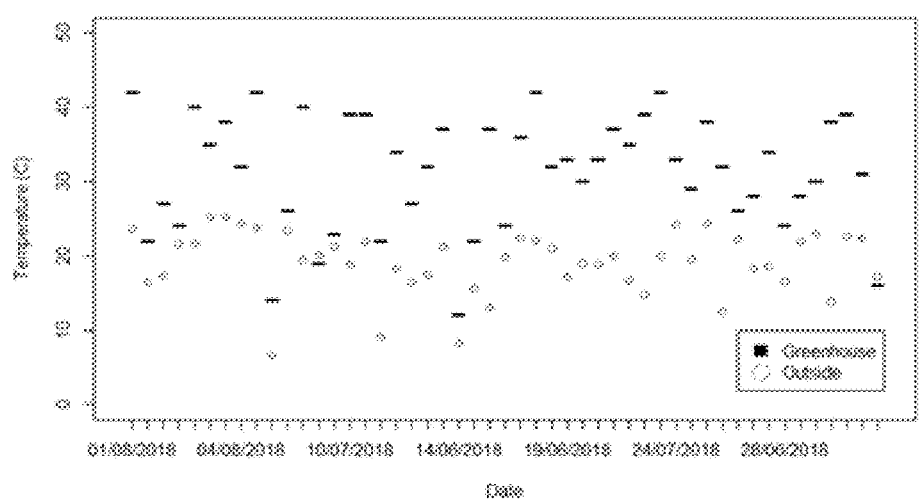
FIG. 9 shows a comparison of greenhouse temperatures to average daily temperatures recorded by Environment Canada.

Biochar (100 mL) or the composite (100 mL) was mixed with 2 L of topsoil to give a final concentration of 5% v/v before the soil was transferred to a 1-gallon pot (16.5×13× 17.8 cm). Five barley seeds were planted approximately one inch below the surface and the pots were transported to a greenhouse. Five pots were prepared per treatment and the treatments encompassed the control (untreated), a CBC control, the FBC control, CBC with *Pseudomonas rhodesiae*, FBC with *Psuedomonas rhodesiae*, CBC with *Delftia tsuruhatenesis*, FBC with *Delftia tsuruhatenesis*, and CBC with *Fictibacillus* sp (discovered as a contaminant strain). The barley was watered every week to saturation and the temperature of the greenhouse was recorded every few days. At the end of the summer, the temperature data was compared to the average daily temperatures recorded by Environment Canada (FIG. 9). It was determined that the greenhouse was overall 12.1° C. (standard deviation: 6.7° C.) warmer than the average daily temperature.

During the first two weeks of growth, the number of germinating seedlings per pot was counted on days 3, 5, 7, 10, and 14 to assess the germination rate. After two weeks, pots were thinned to three seedlings and allowed to grow undisturbed for the remaining seven weeks. To analyze the plants, shoots were cut right above the soil line and transported back to the lab. The barley fruit was removed and the remaining shoot was measured before drying at 45° C. in a fan oven for 48 hours. The fruit was weighed to determine wet weight before drying at 45° C. for 48 hours. Shoots and fruits were re-weighed after drying. Results were analyzed by one-way ANOVA. A Tukey Honestly Significant Difference (Tukey HSD) test was performed to identify significant results (Supplementary Information). CBC and FBC treatments were separated for statistical testing and all analyses were performed in RStudio running R 3.5.0.

DNA Extraction and Amplification

DNA was extracted from cell colonies cultured on nutrient agar using the SurePrep™ Soil DNA Isolation Kit from Fisher BioReagents™ (BP281550) following the provided guidelines, with one small alteration. Briefly, approximately 1 μL of bacterial cells were removed from a plate and directly extracted using the DNA kit as instructed. Following the extraction, samples were amplified using the GoTaq® Green Master Mix from Promega (ADM7122 00002530644) and ReadyMade™ universal 16S primers obtained from Integrated DNA Technologies (51-01-19-06 and 51-01-19-07). The sequence of the forward primer was AGAGTTTGATCCTGGCTCAG (SEQ ID NO: 1) and the sequence of the reverse primer was ACGGCTACCTTGT-TACGACTT (SEQ ID NO: 2). Samples were sent to Genome Quebec for 16S Sanger Sequencing and analyzed using the NCBI Standard Nucleotide BLAST.

Soil Analysis

A series of tests were conducted on the soil using a commercially available test kit and analytical techniques to determine the impact of the treatment on soil health. The HI 3896 HANNA Soil Test Kit was purchased from HANNA Instruments and used for the analysis. The results for the pH, nitrogen, and phosphorus tests were further investigated using analytical techniques (pH probe and absorbance measurements). The procedure for the analysis of NPK from the kit was followed and is summarized here briefly: 1.2 mL of soil was suspended in 7.5 mL of extraction solution and allowed to settle for 5 minutes. 2.5 mL of the extract was transferred to a clean test tube and reacted with an excess of nitrogen reagent; an additional 2.5 mL of extract was transferred to another test tube and reacted with an excess of phosphorus reagent; and 0.5 mL of extract was transferred to a tube containing 2.0 mL of extraction solution and reacted with an excess of potassium reagent. All tubes were vigorously shaken and analyzed visually according to the color charts provided. After the tubes were analyzed according to the kit, absorbance measurements were taken of the N and P tubes to provide more accurate measurements. The sample was filtered through a 0.22 μm filter into a cuvette and a full UV-Vis scan was conducted to determine the Amax (332 nm for N, 710 nm for P). Absorbance measurements were repeated in triplicate and three pots per treatment were sampled. For the pH measurements, 1.2 mL of soil was suspended in an indicator solution and incubated for five minutes before the pH was determined using a color chart (supplied by HANNA). pH measurements using a pH probe were also conducted in triplicate.

Results

Biochar Characterization

The pH of the FBC was determined to be 9.42 (standard deviation: 0.18) and the CBC had a pH of 7.84 (standard deviation: 0.09). The IR spectra for both biochars were very similar, with prominent peaks around 3400 cm−1, 2900 cm−1, 1600 cm−1, 1400 cm−1, and 1150 cm−1. The CHN elemental analysis indicated 87% C, 2.6% H, 0.3% N, 0.1% S, and >1% ash. The surface area was determined to be 29.13 $m^2/g$ for the coarse biochar and 117.34 $m^2/g$ for the fine biochar. The particle size of both biochars was determined by sieving through a 150 μm sieve. Biochar that passed through the sieve was categorized as FBC (particles 150 μm). The biochar that did not pass through the sieve was categorized as CBC (particles ≥150 μm).

SEM

Figure 1B:
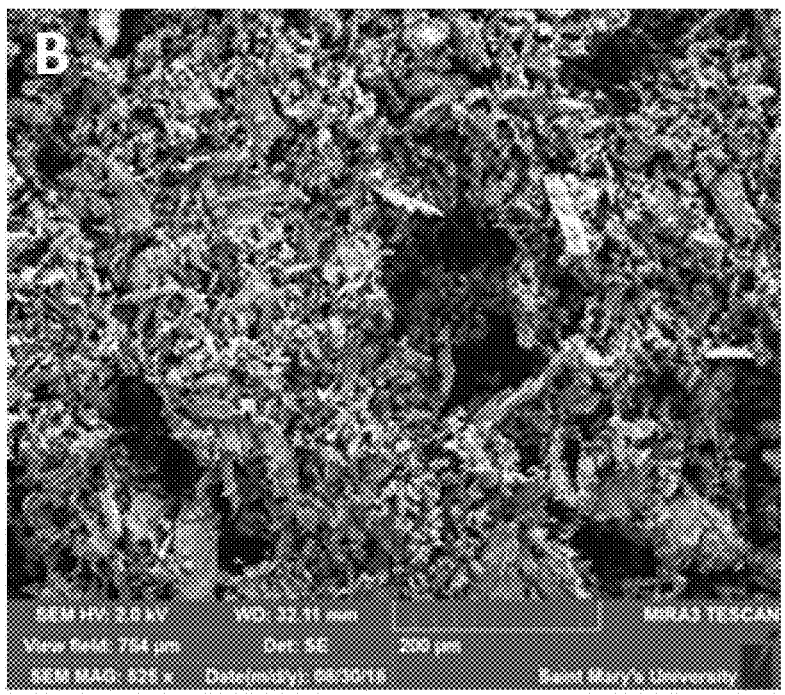
Figure 2A:
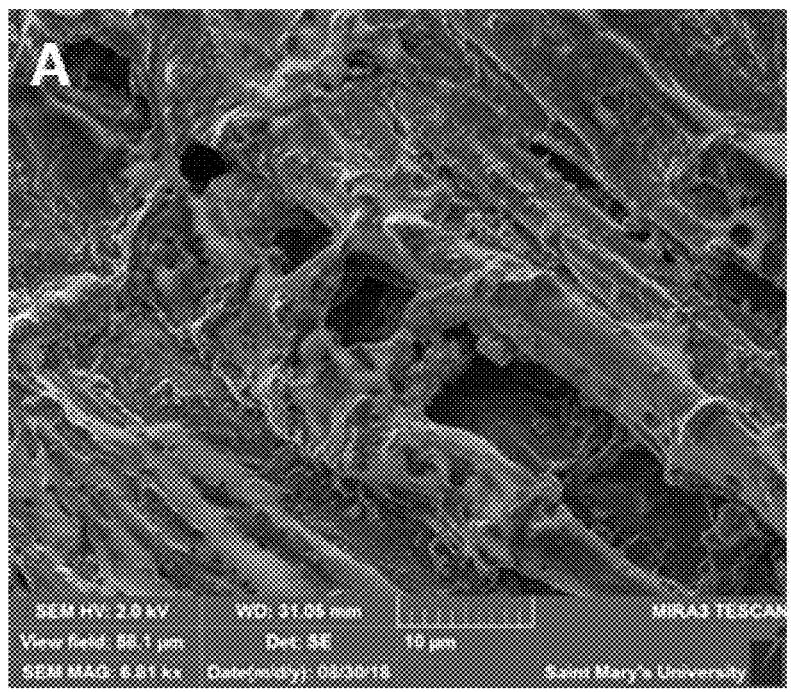
FIG. 2 (A-D) shows SEM images of the biochar microbial composite. CBC with *Delftia tsuruhatenesis* (A) and FBC with *Delftia tsuruhatenesis* (B). CBC with *Pseudomonas rhodesiae* (C) and FBC with *Pseudomonas rhodesiae* (D).
Figure 2B:
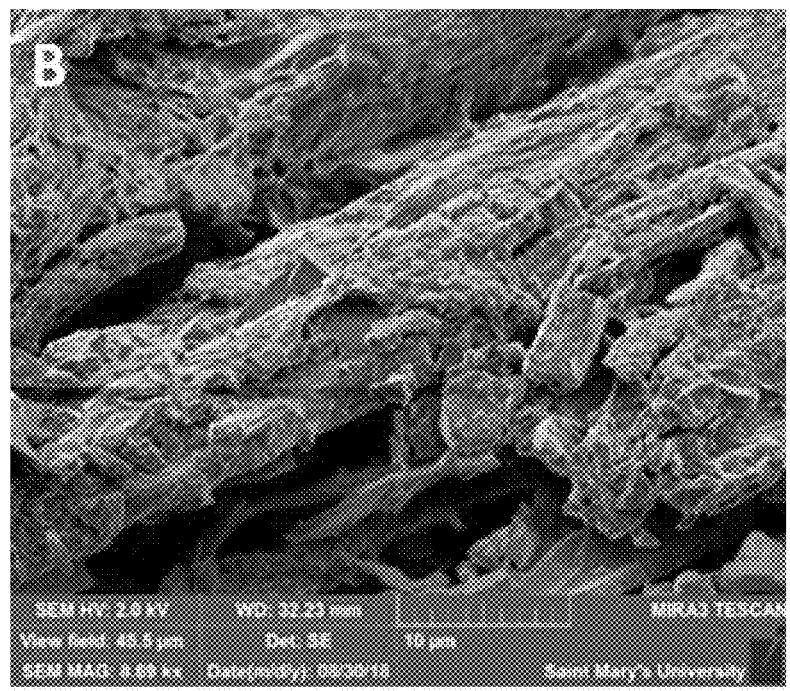
Figure 2C:
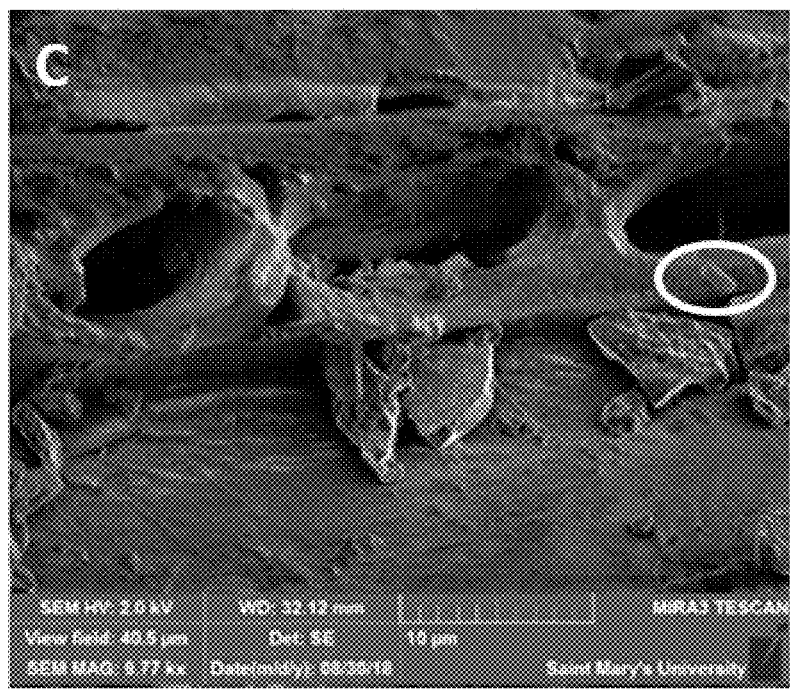
Figure 2D:
Figure 10A:
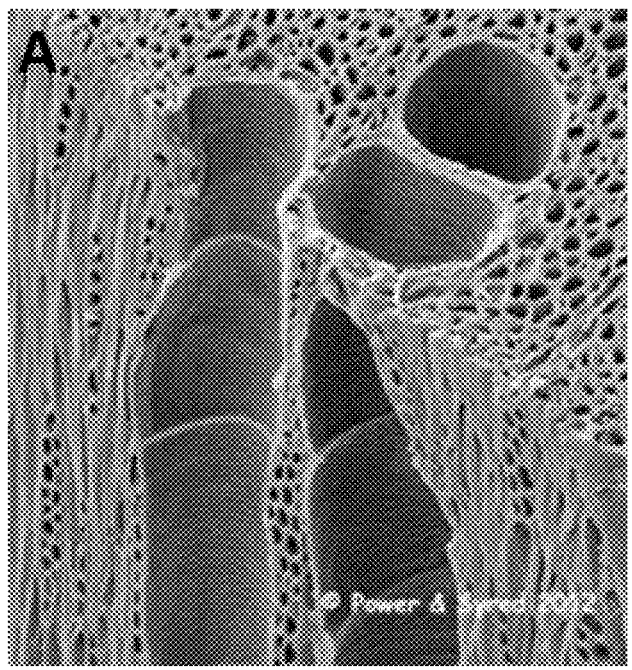
FIG. 10 (A, B) shows an SEM image comparison of CBC to plant tissue. SEM images of ash wood xylem [https://psmicrographs.com/sems/flowers-plants/] (A) and CBC obtained from the MacQuarrie group (B).
Figure 10B:
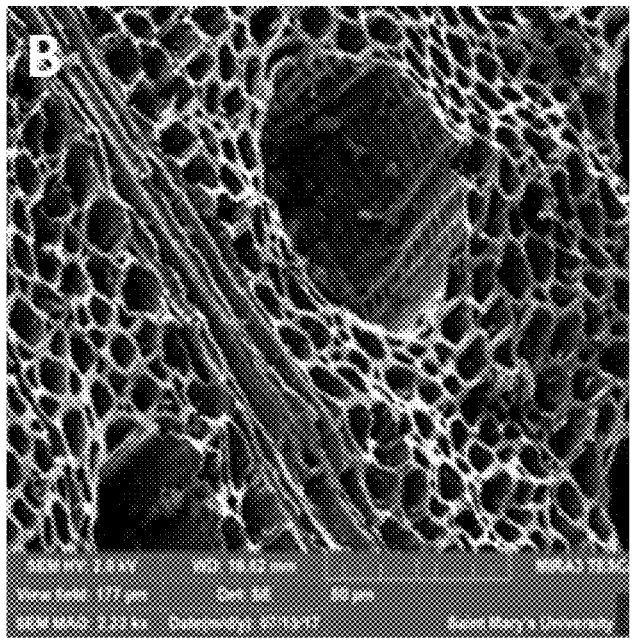
Figure 11A:
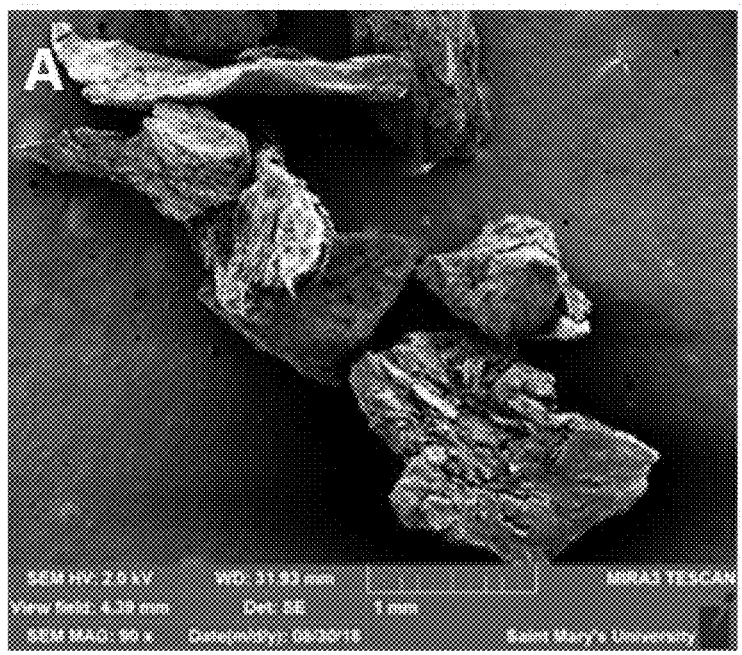
FIG. 11 (A-F) shows a comparison of coarse and fine biochar at three different magnifications. Coarse biochar at 1 mm (A), fine biochar at 1 mm (B), coarse biochar at 200 μm (C), fine biochar at 200 μm (D), coarse biochar at 20 μm (E), fine biochar at 20 μm (F).
Figure 11B:
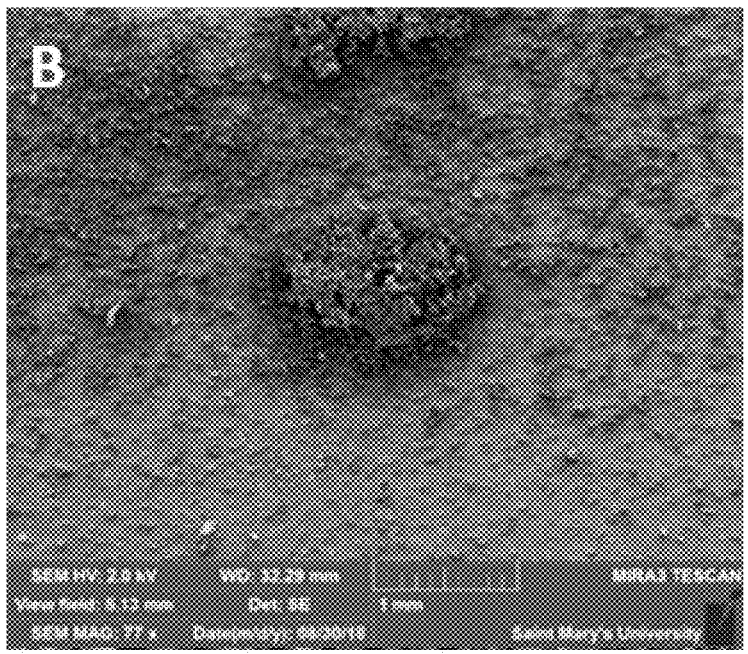
Figure 11C:
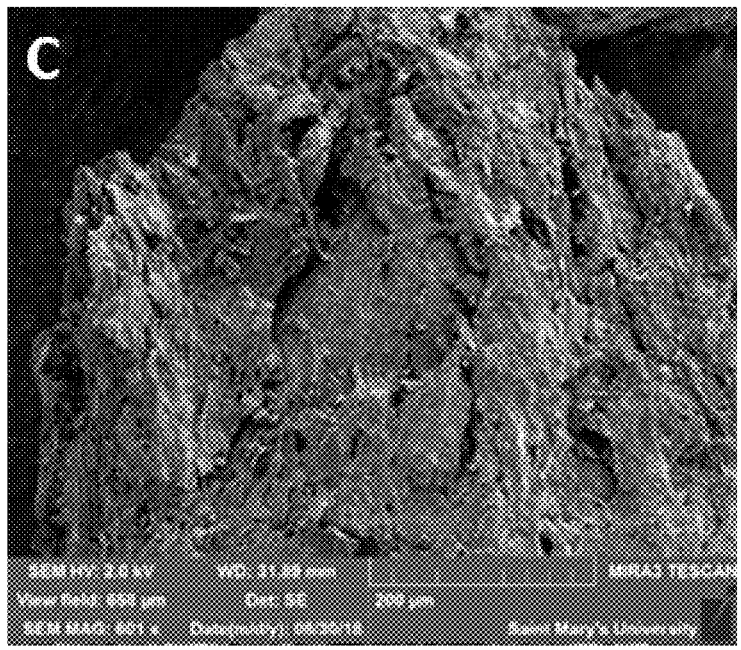
Figure 11D:
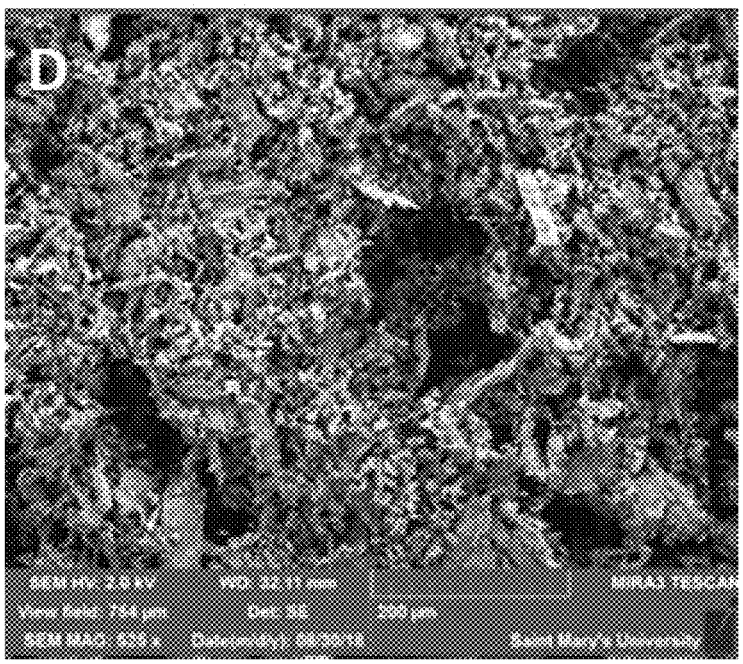
Figure 11E:
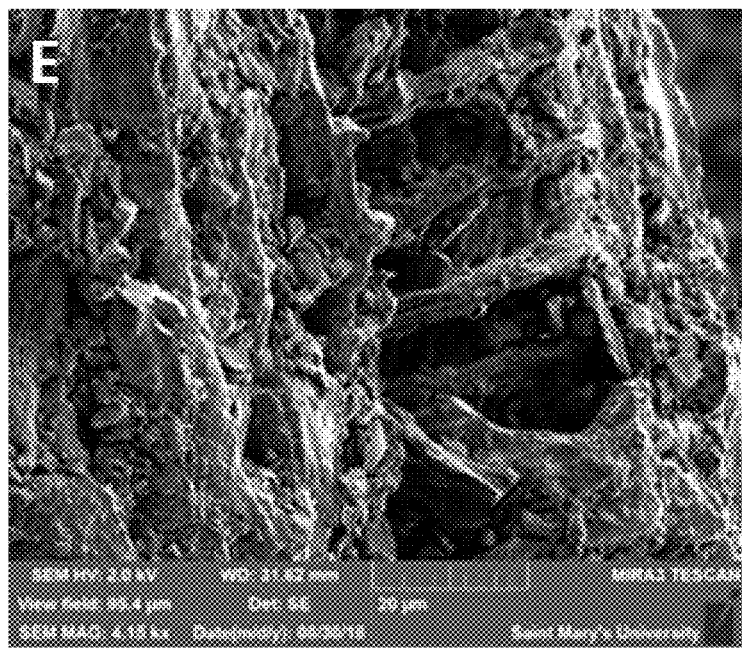
Figure 11F:
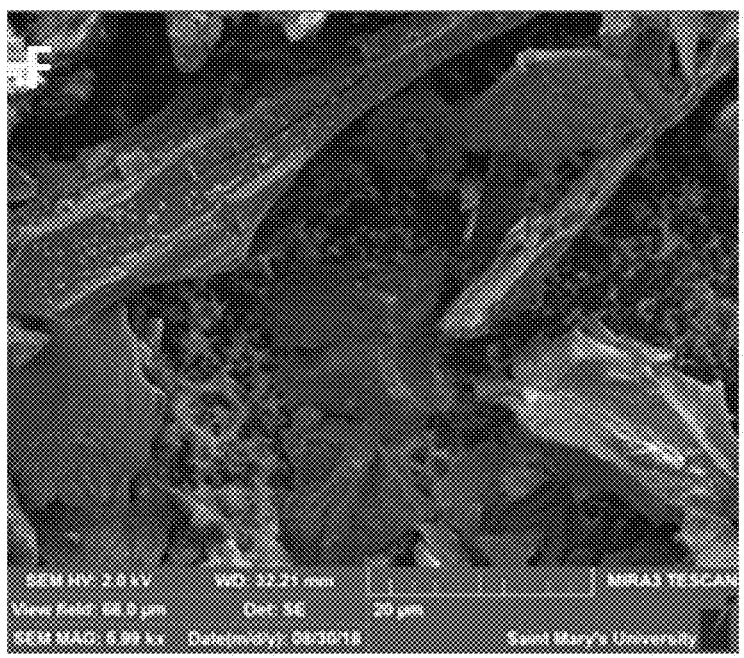

Scanning electron microscopy was utilized to observe surface morphology of the biochars before and after inoculation. The FBC was primarily composed of particles that were less than 50 μm lengthwise while the CBC contained particles that were over 1 mm in length. The surface features of the CBC was similar to plant tissue, which can be attributed to the forest waste that was utilized as feedstock (FIG. 10). The differences in surface composition became quite apparent when SEM was utilized to observe surface morphology (FIG. 1 and FIG. 11). The surface of the CBC was rough and displayed unique features such as ridges, layers, and changes in texture. In contrast, the FBC was composed of particulate matter that had smoother surfaces and fewer unique features per piece.

Observing the biochar-microbial composite under SEM revealed different colonization patterns between the two bacterial strains that were consistent regardless of the biochar scaffold (FIG. 2). *Delftia tsuruhatenesis* produced a biofilm that coated the biochar, resulting in organic deposits that obscured many of the surface details. Due to the biofilm, it was difficult to locate any bacterial cells. The colonization of *Pseudomonas rhodesiae* was easier to observe, as no biofilm was formed. Single cells were observed close to surface features that resulted in a rough texture, potentially providing a better attachment site for the cell. Minimal modification to the surface of the biochar was observed in this case.

Barley Growth

Figure 3:
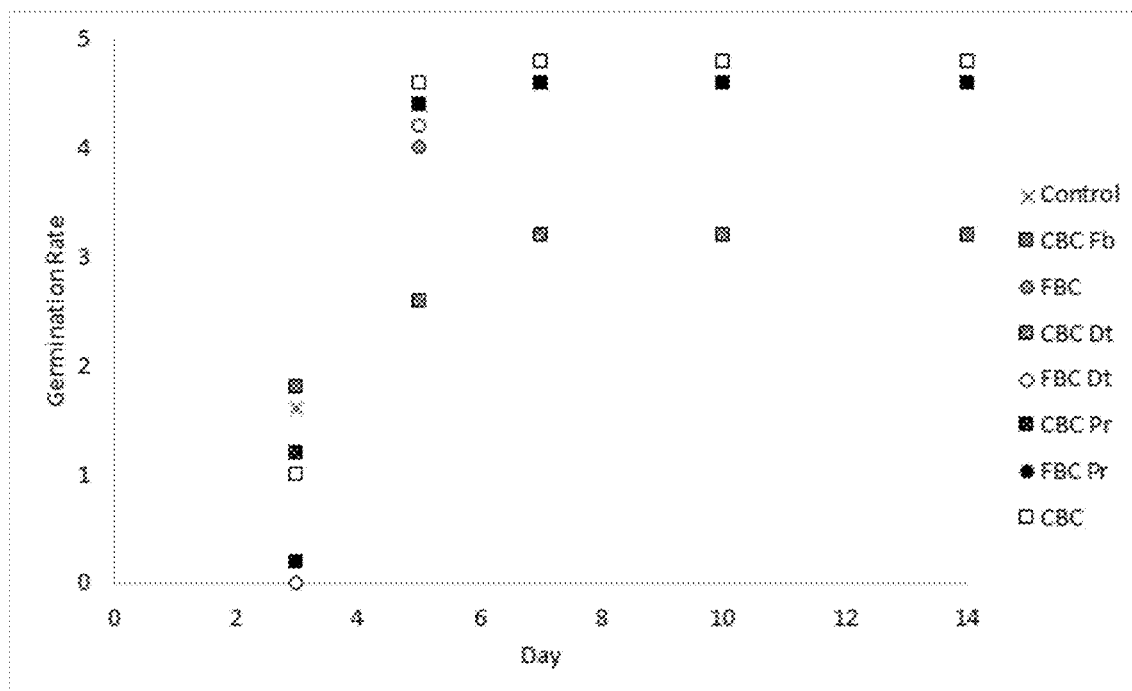
FIG. 3 shows the germination rate of different barley treatments (n=5). Treatment abbreviations are as follows: Control—no biochar, CBC—coarse biochar control, FBC—fine biochar control, Dt—*Delftia tsuruhatenesis*, Pr—*Pseudomonas rhodesiae*, Fb—*Fictibacillus*

The germination rate was assessed to determine if the addition of the biochar or inoculated composite had any impact on the rate at which the plants germinated over a two-week period. No significant differences were observed during the initial growth phase other than the significantly lower germination rate observed for the CBC inoculated with *Delftia tsuruhatenesis* (FIG. 3 and FIG. 10). No investigation was conducted into the lowered germination rate of the CBC *D. tsuruhatenesis treatment* as enough plants were obtained for future analysis.

Figure 12:
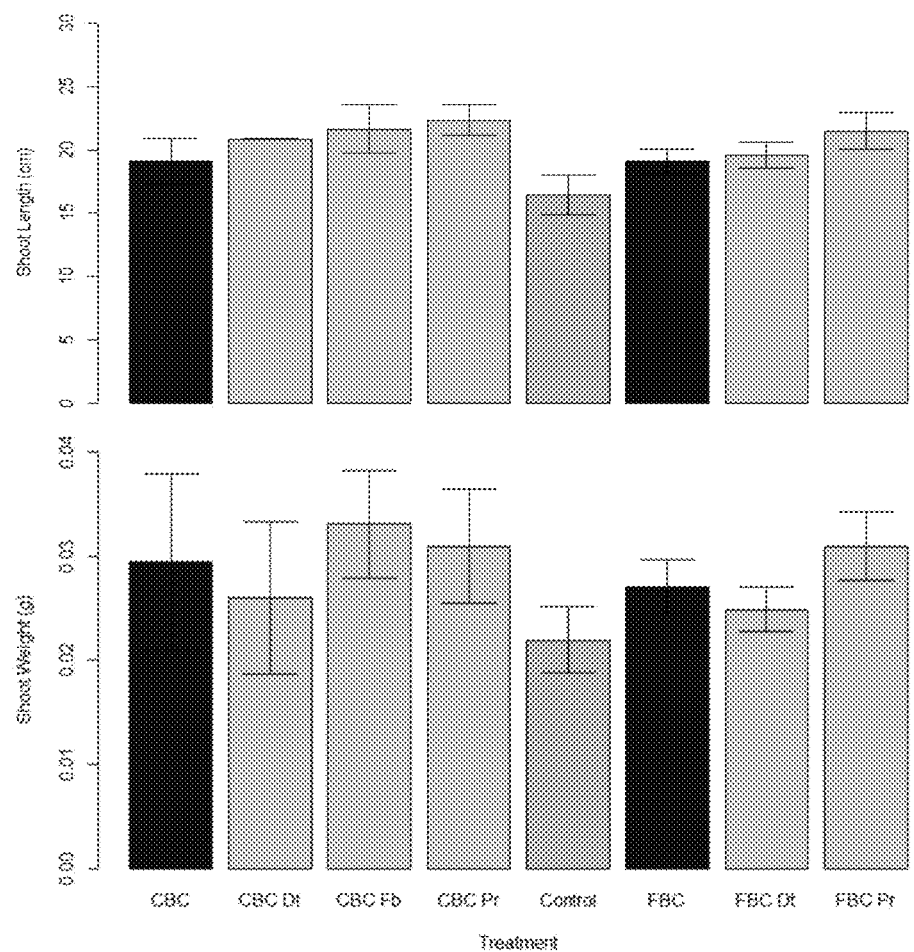
FIG. 12 shows shoot length (top) and shoot weight (bottom) of barley shoots removed for thinning purposes after 2 weeks of growth (n=2-9). Error bars represent standard error of the mean. Treatment abbreviations are as follows: Control—no biochar, CBC—coarse biochar control, FBC—fine biochar control, Dt—*Delftia tsuruhatenesis*, Pr—*Pseudomonas rhodesiae*, Fb—*Fictibacillus*.

After the germination assessment was completed, shoots were thinned to 3 shoots per pot, and the removed shoots were measured and weighed after drying to get an indication of early growth. Although no statistically significant differences were observed, all treatment groups were beginning to perform better than the control (FIG. 12). Treatments containing a bacterial partner demonstrated a larger growth increase than the biochar by itself. No differences between the biochars were observed at this two week mark.

Figure 4:
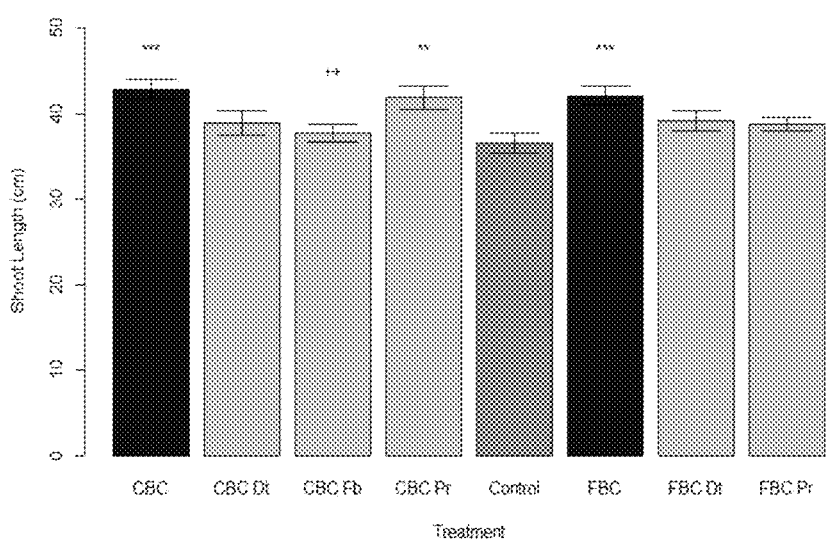
FIG. 4 shows the shoot length of barley after 9 weeks of growth (n=12-15). Error bars represent standard error. * indicates $p \leq 0.1$,  indicates $p \leq 0.05$, * indicates $p \leq 0.01$ when compared to the control based on a Tukey HSD test. + indicates $p \leq 0.1$, ++ indicates $p \leq 0.05$, +++ indicates $p \leq 0.01$ when compared to the biochar control based on a Tukey HSD test. Treatment abbreviations are as follows: Control—no biochar, CBC—coarse biochar control, FBC—fine biochar control, Dt—*Delftia tsuruhatenesis*, Pr—*Pseudomonas rhodesiae*, Fb—*Fictibacillus*.

After 9 weeks of growth, significant differences in both shoot growth and barley production were observed. Shoot lengths of both the CBC and FBC controls demonstrated significantly increased lengths compared to the no biochar control (FIG. 4). No difference was observed between the FBC and CBC. However, almost all treatments containing bacterial partners had shorter shoot lengths than the biochar alone, with CBC Fb producing significantly less vegetative growth ($p=0.038$). This trend appeared to be indicating that the bacteria that was added to the system was actually reducing the growth of the plant as opposed to increasing it. CBC Pr actually demonstrated significantly increased growth compared to the control ($p=0.020$) and growth similar to both biochars when cultured using CBC.

Figure 5:
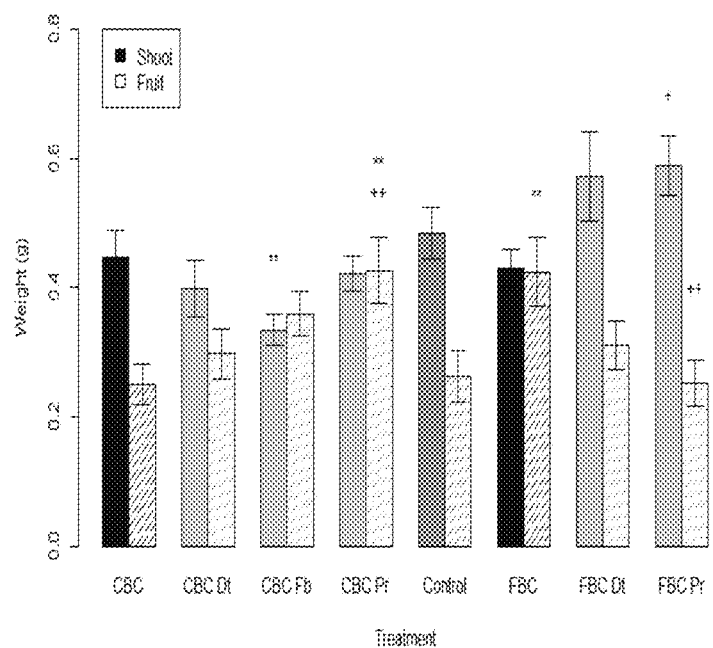
FIG. 5 shows fruit dry weight and shoot dry weight of barley after 9 weeks of growth (n=14-15). Error bars represent standard error. * indicates $p \leq 0.1$,  indicates $p \leq 0.05$, * indicates $p \leq 0.01$ when compared to the control based on a Tukey HSD test. + indicates $p \leq 0.1$, ++ indicates $p \leq 0.05$, +++ indicates $p \leq 0.01$ when compared to the biochar control based on a Tukey HSD test. Treatment abbreviations are as follows: Control—no biochar, CBC—coarse biochar control, FBC—fine biochar control, Dt—*Delftia tsuruhatenesis*, Pr—*Pseudomonas rhodesiae*, Fb—*Fictibacillus*.

When dried shoot weights and dried fruit weights were compared, different growth patterns were observed (FIG. 5). Both biochar control treatments produced dry weights not significantly different than the control, indicating that the allocation of resources for shoot growth was similar. The shoot weights of CBC treatments significantly decreased in the presence of a bacterial partner while the shoot weights of FBC treatments containing bacteria significantly increased. Barley fruit weight was also measured to determine the yield, and a trend opposite to the shoot weight was observed. The CBC control was still similar to the no biochar control, but the FBC control produced significantly more barley. In CBC trials containing a bacterial partner, fruit weight was increased while the opposite trend was observed in FBC trials.

Figure 6:
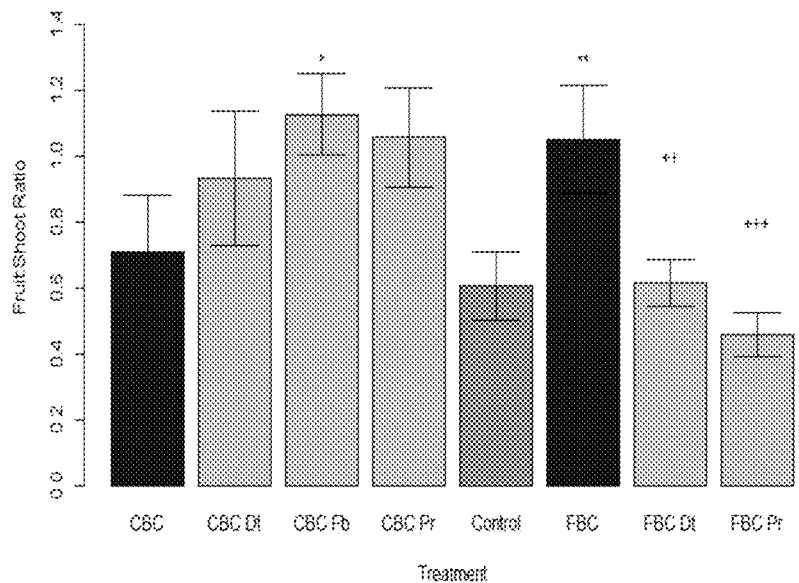
FIG. 6 shows the fruit:shoot ratio for barley after 9 weeks of growth (n=14-15). Error bars represent standard error. * indicates $p \leq 0.1$,  indicates $p \leq 0.05$, * indicates $p \leq 0.01$ when compared to the control based on a Tukey HSD test. + indicates $p \leq 0.1$, ++ indicates $p \leq 0.05$, +++ indicates $p \leq 0.01$ when compared to the biochar control based on a Tukey HSD test. Treatment abbreviations are as follows: Control—no biochar, CBC—coarse biochar control, FBC—fine biochar control, Dt—*Delftia tsuruhatenesis*, Pr—*Pseudomonas rhodesiae*, Fb—*Fictibacillus*.

Since the trend demonstrated in FIG. 5 shows that fruit weight decreased as shoot weight increased, the fruit:shoot ratio was calculated as a way to easily display the yield (FIG. 6). Differences in overall yield became very apparent when the ratio was utilized. Increased yield was observed when CBC was inoculated with *Fictibacillus* ($p=0.113$) and when FBC was utilized by itself with no bacterial partner ($p=0.028$). When a bacterial partner was introduced to FBC, the yield significantly decreased compared to the FBC alone ($p=0.032$, $p=0.002$).

Soil Analysis

Figure 7:
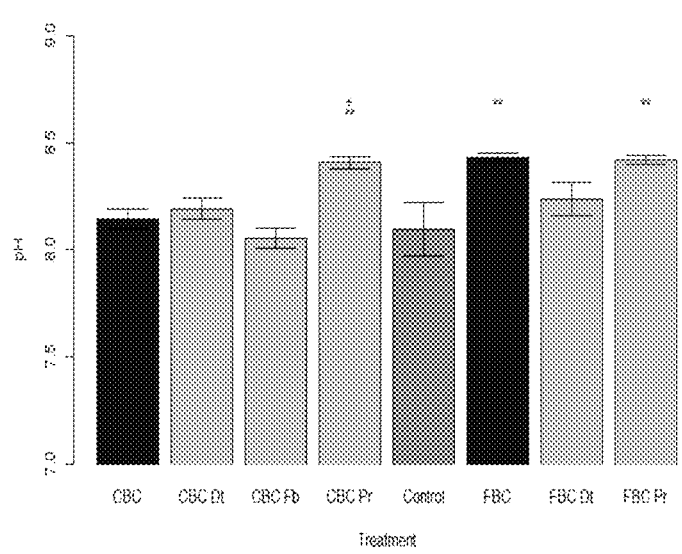
FIG. 7 shows pH values for the soil after 9 weeks of barley growth (n=9). Error bars represent standard error. * indicates $p \leq 0.1$,  indicates $p \leq 0.05$, * indicates $p \leq 0.01$ when compared to the control based on a Tukey HSD test. + indicates $p \leq 0.1$, ++ indicates $p \leq 0.05$, +++ indicates $p \leq 0.01$ when compared to the biochar control based on a Tukey HSD test. Treatment abbreviations are as follows: Control—no biochar, CBC—coarse biochar control, FBC—fine biochar control, Dt—*Delftia tsuruhatenesis*, Pr—*Pseudomonas rhodesiae*, Fb—*Fictibacillus*.
Figure 8:
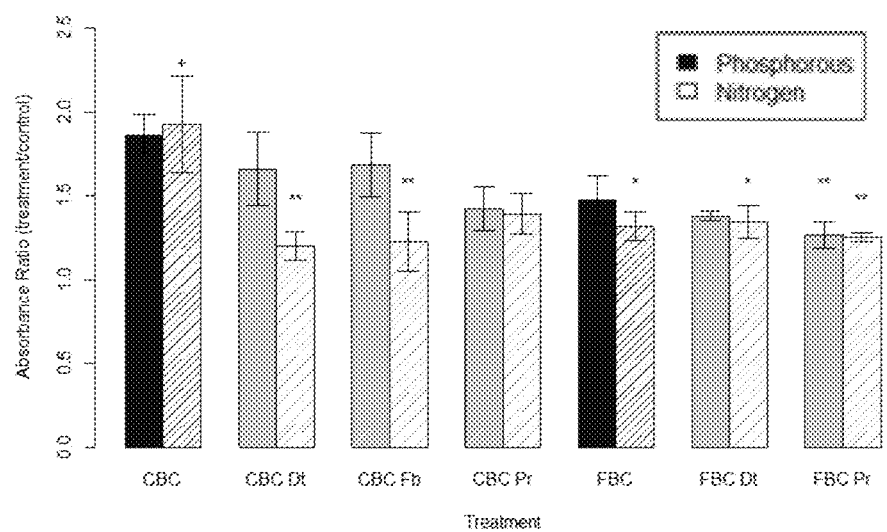
FIG. 8 shows absorbance ratios for the analysis of nitrogen and phosphorous in soil (n=9). Error bars represent standard error. * indicates $p \leq 0.1$,  indicates $p \leq 0.05$, * indicates $p \leq 0.01$ when compared to the coarse biochar control based on a Tukey HSD test. + indicates $p \leq 0.1$, ++ indicates $p \leq 0.05$, +++ indicates $p \leq 0.01$ when compared to the fine biochar control based on a Tukey HSD test. Treatment abbreviations are as follows: Control—no biochar, CBC—coarse biochar control, FBC—fine biochar control, Dt—*Delftia tsuruhatenesis*, Pr—*Pseudomonas rhodesiae*, Fb—*Fictibacillus*.

The pH of the treatment groups was measured to determine if there was a correlation between growth changes and soil pH (FIG. 7). It was observed that the CBC treatments had pH values mostly similar to the control while the FBC treatments had pH values that were significantly higher (p=0.020, p=0.025), except for FBC Dt. This observation is consistent with the pH values of the biochar itself; the CBC had a more neutral pH while the pH of the FBC was significantly more alkaline. Despite the fact that significant differences in pH were observed between different treatments, the pH did not appear to be correlated to the changes in the fruit. NPK (nitrogen, phosphorous, and potassium) levels were also assessed to determine if any correlations could be drawn between growth and soil health. A commercially available test kit from HANA Instruments was utilized. The instructions from the kit were followed and no noticeable differences were observed between the trials (Table 1). When absorbance measurements were utilized as a way to analyze the N and P content, N was significantly higher in the CBC control than in the FBC control. N was lower in the CBC inoculated trials compared to the CBC control, while N in the FBC inoculated trials did not differ from the FBC control (but were significantly lower than the CBC control). Only one significant difference was observed for P (FIG. 8).

nutrient broth autoclave cycle was complete, approximately 9.5 mL of the 50% nutrient broth was added to a 15 mL centrifuge tube. This step was repeated twice, resulting in 2 separate centrifuge tubes containing approximately 9.5 mL of 50% nutrient broth in each. Using a disposable inoculation loop a small amount (approximately one loop-full) of *Fictibacillus enclensis* was removed from an agar plate and added to one of the centrifuge tubes. Approximately 50 microliters of *Pseudomonas rhodesiae* was removed from a frozen stock vial and added to the second centrifuge tube. Both of the centrifuge tubes inoculated with the bacteria, were placed in a 30° C. incubator and allowed to grow for approximately 24-hours. 800 mL of the 50% nutrient broth was added to 800 mL of biochar to prepare the 1:1 biochar:nutrient broth control treatment. *Fictibacillus enclensis* was removed from the incubator and added to 800 mL of 50% nutrient broth. The 50% nutrient broth inoculated with *Fictibacillus enclensis* was added to 800 mL of biochar to prepare the *Fictibacillus enclensis* treatment. The same steps were followed for the *Pseudomonas rhodesiae* treatment (800 mL of 50% nutrient broth and 800 mL of biochar). The biochar/nutrient broth mixture and both of the biochar/nutrient broth/bacteria mixtures were placed in a 30° C. incubator and shaken for several hours until potting process began. The remaining 800 mL of biochar was used for the biochar control treatment.

TABLE 1

| | Treatment | | | | | | | | | | | |
|---|---|---|---|---|---|---|---|---|---|---|---|---|
| | Control | | | Dt* CBC | | | CBC (cont) | | | CBC Dt | | |
| Nitrogen | Trace | Trace | Trace | Trace | Trace | Trace | Trace | Trace | Trace | Trace | Trace | Trace |
| Phosphorous | Low Med | Med | Med High | High | High | High | High | High | High | High | High | — |
| Potassium | Low | Low | Low | Low Med | Low Med | Low Med | Low | Low | Trace | Low | Low | Low |
| pH | 6-7 | 7-8 | 7-8 | 7-8 | 7-8 | 7-8 | 7-8 | 7-8 | 7-8 | 7-8 | 7-8 | 7-8 |

| | CBC Pr | | | FBC | | | FBC Dt | | | FBC Pr | | |
|---|---|---|---|---|---|---|---|---|---|---|---|---|
| Nitrogen | Trace | Trace | Trace | Trace | Trace | Trace | Trace | Trace | Trace | Trace | Trace | Trace Low |
| Phosphorous | High | High | Med High | High | High | High | High | High | High | High | High | Med High |
| Potassium | Low | Low | Low | Low | Low | Low | Low | Low | Low | Low | Low | Low |
| pH | 8 | 8 | 8 | 8 | 8 | 8 | 7-8 | 7-8 | 7-8 | 7-8 | 7-8 | 7-8 |

A formulation using biochar inoculated with *Fictibacillus enclensis* was mixed into soil before planting seeds for germination. As described in Example 1, a 9-week barley trial gave rise to an increased fruit to shoot ratio—the barley stalks were shorter in length, but the weight of the fruit was significantly heavier compared to the controls (no treatment or treatment with biochar alone). Without being bound by theory, these findings suggest that the strain of bacteria in the formulation encouraged the barley to redirect its nutritional resources to producing larger fruit instead of growing taller plants. The formulation has also been tested using Nova Scotia strawberries, blueberries and broccoli.

Methods

The appropriate amount of pots (48) per trial were sterilized using three rinsing stations prior to planting. The pots were first bleached, then washed with soap and water, then rinsed and left to dry. 3.2 L of biochar was measured in a fume hood and autoclaved at 121° C. for 30 minutes. 2.4 L of 50% nutrient broth was prepared (5 g tryptone, 5 g sodium chloride, 3 g yeast extract in 1 L of water for 100% nutrient broth) and autoclaved at 121° C. for 30 minutes. After the All pots were sprayed with 70% ethanol prior to the planting process. A 5% v/v biochar/soil (100 mL biochar/2000 mL soil) standard was mixed with an equal volume of 50% nutrient broth for each applicable treatment. Each of the three trials (strawberries, blueberries and broccoli) were composed of six treatments, and each treatment contained eight individual pots (n=48 per trial). The six treatments were: control, biochar control (BC), nutrient broth/biochar control (BCNB), conventional fertilizer control (Fert), *Fictibacillus enclensis* treatment (F. enc) and *Pseudomonas rhodesiae* treatment (Prho). For the control treatment and the fertilizer control treatment, 2000 mL of Nova Scotia top soil was added into each pot and the seedling was planted. A 10-15-10 fertilizer was diluted with the appropriate volume of water (according to instructions on package) and added to the pots. Plants were fertilized every two weeks. To prepare the biochar control treatment group 2000 mL of soil was mixed with 100 mL of biochar in each pot and the seedlings were planted. The nutrient broth/biochar control was prepared by mixing 2000 mL of Nova Scotia topsoil with 100 mL 1:1 biochar:nutrient broth in each pot, followed by the planting of the seedling. The two bacteria treatments were prepared the same way as the nutrient broth/biochar control pots, except the appropriate bacteria/nutrient broth/biochar mixture was used for each. To ensure adequate mixing of the soil, the soil was added in 1000 mL increments and mixed with 50 m L increments of biochar/nutrient broth mixture into each pot at a time.

Strawberry Growth Observations

Leaf surface area and herbivory damage of the strawberries was measured. The amount of foliage (leaf area) in the plant canopy is an important characteristic of the plant (Bréda, 2008). Plant leaf area is a primary determinant of production, carbon balance and nutrient and water uptake for the plant. Plants that contain a larger leaf area, should undergo greater amounts fruit production, growth and nutrient uptake.

It was found that the strawberry plants treated with our formulation had a significantly larger leaf surface area per plant when compared to the control group (no treatment) and no statistical difference was detected between the leaf surface area of strawberry plants treated with our formulation compared to plants treated with a conventional chemical fertilizer. The eco-friendly formulation is currently on par with that of a conventional fertilizer. The total herbivory damage observed on the strawberry plants was also measured and it was found that the plants treated with the formulation had a statistically significant increase in resistance to pests compared to the control groups (no treatment and biochar alone).

Broccoli Growth Observations

Figure 13:
FIG. 13 shows an image of 6 out of 8 randomly selected broccoli plants from the greenhouse treated with *Fictibacillus enclensis*.
Figure 14:
FIG. 14 shows an image of 5 out of 8 randomly selected broccoli plants treated with a conventional fertilizer.

In 6 out of 8 randomly selected broccoli plants from the greenhouse treated with *Fictibacillus enclensis*, growth between each plant is fairly consistent, stalk of broccoli very thick, similar to the fertilizer treatments (FIG. 13). In 5 out of 8 randomly selected broccoli plants treated with a conventional fertilizer, growth is similar and very comparable to the growth of the plants treated with *Fictibacillus enclensis* (FIG. 14).

Figure 15:
FIG. 15 shows an image of a comparison of two plants treated with *Fictibacillus enclensis* (two plants on left in black pots) and two plants treated with a conventional fertilizer (two plants on right in grey pots).

In a comparison of two plants treated with *Fictibacillus enclensis* (two plants on left in black pots) and two plants treated with a conventional fertilizer (two plants on right in grey pots), heights of plants and stalk widths are very similar (FIG. 15).

Figure 16:
FIG. 16 shows an image of a comparison of three control broccoli plants, planted in Nova Scotia topsoil (three plants on left in grey pots) and two plants treated with *Fictibacillus enclensis* (two plants on right in black pots).

In a comparison of three control broccoli plants, planted in Nova Scotia topsoil (three plants on left in grey pots) and two plants treated with *Fictibacillus enclensis* (two plants on right in black pots), *Fictibacillus enclensis* treated plants are taller and stalks are much wider, which may be beneficial when the plant begins to head and needs more strength and support (FIG. 16).

Figure 17:
FIG. 17 shows an image of insect damage located on one of the broccoli plants in the control (no treatment) group.

Insect damage located was only observed on one of the broccoli plants in the control (no treatment) group (FIG. 17). This was the only pest damage observed on the broccoli plants.

Figure 18A:
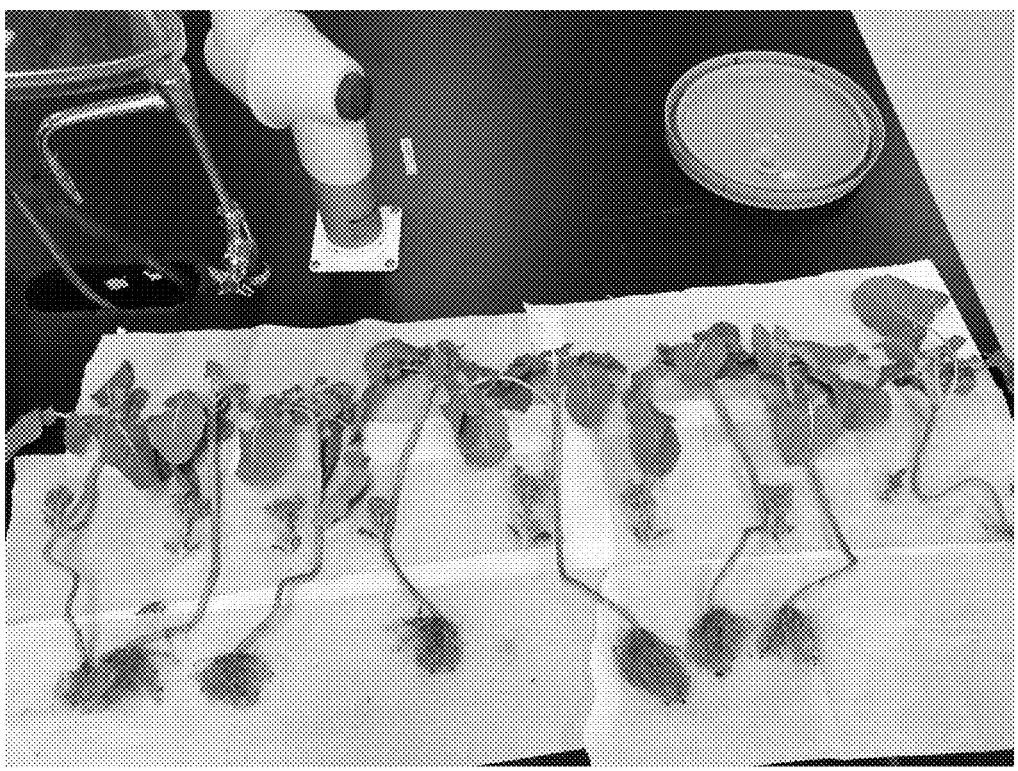
FIG. 18 (A-C) shows an image of harvested broccoli treated with fertilizer treatment (A), *Fictibacillus enclensis* treatment (B), and control treatment (C).
Figure 18B:
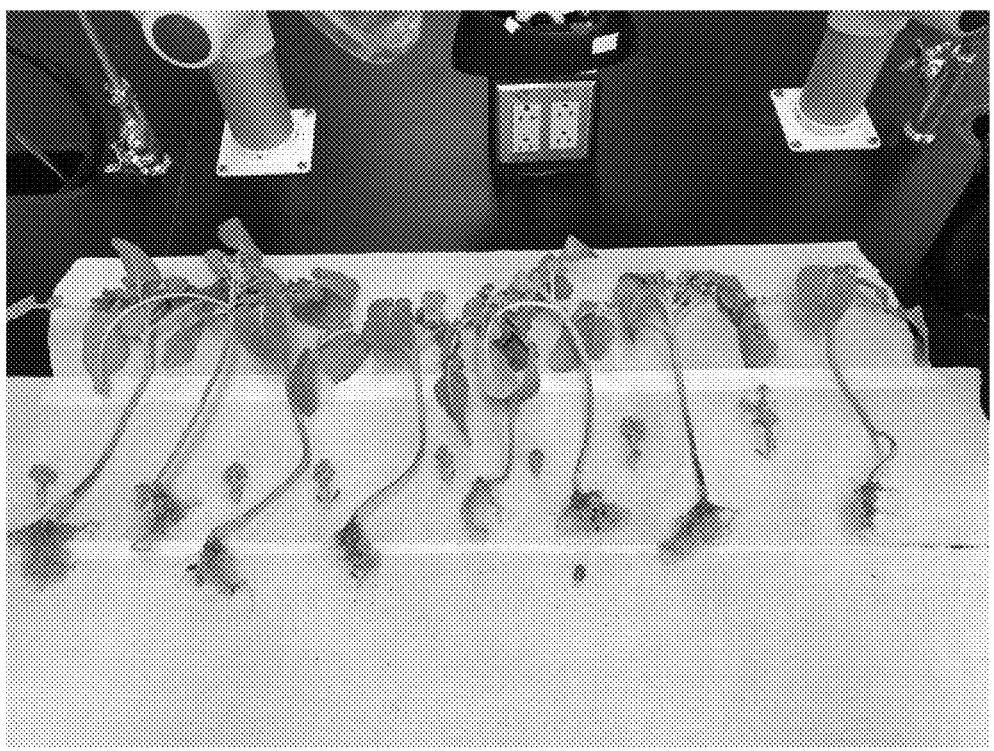
Figure 18C:
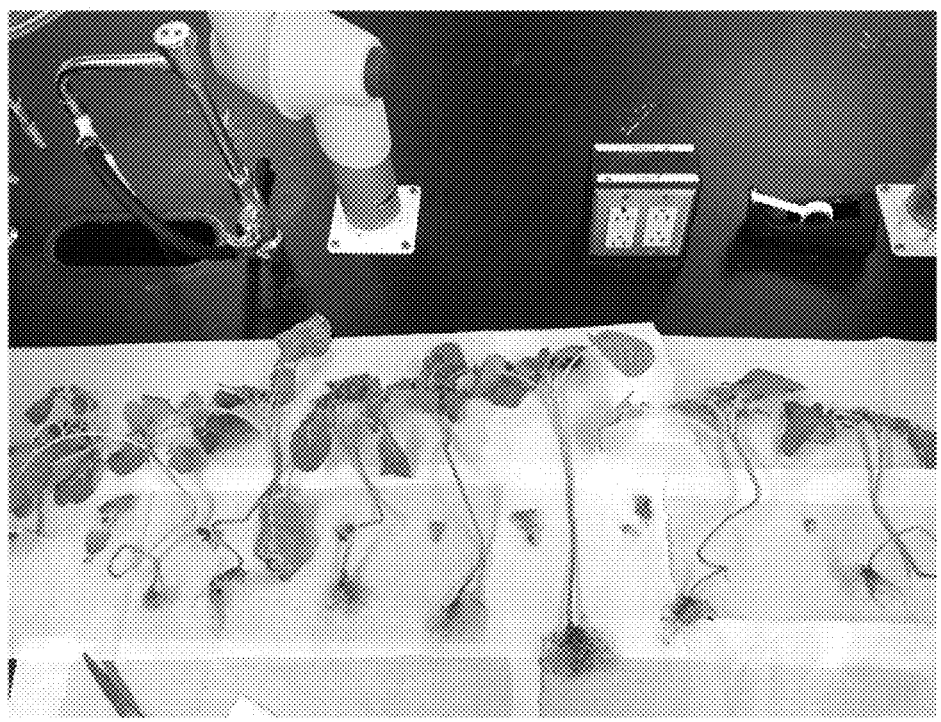

Broccoli treated with fertilizer (FIG. 18A), *Fictibacillus enclensis* (FIG. 18B), or no treatment (control) (FIG. 18C) were harvested.

Figure 19:
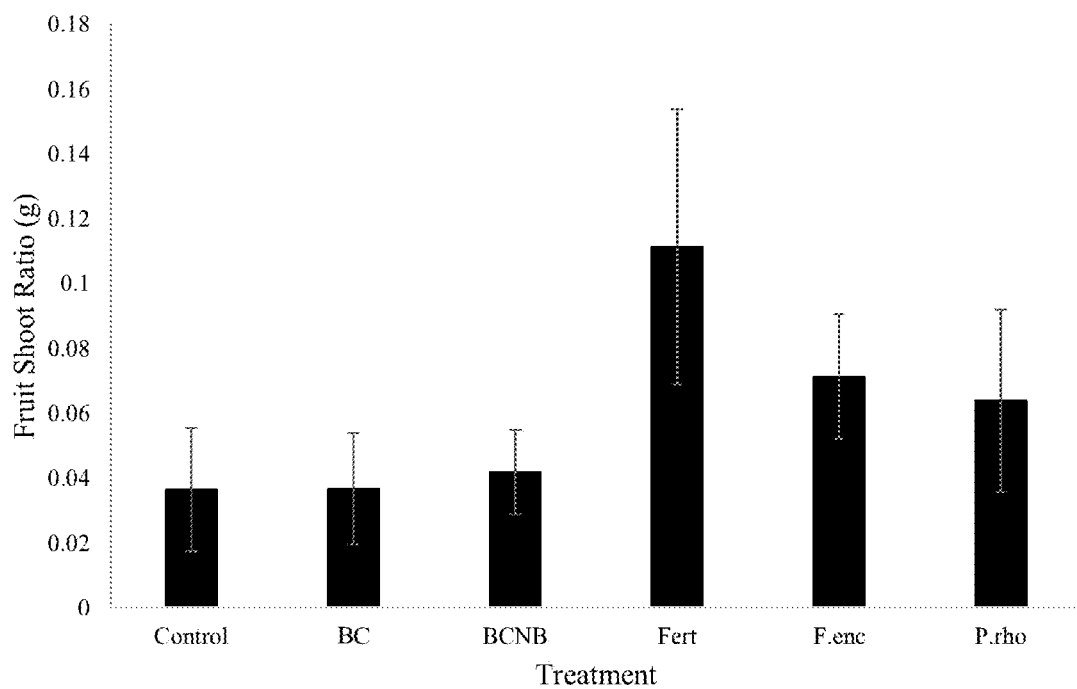
FIG. 19 shows a graph depicting fruit-shoot ratio of treated vs. non-treated harvested broccoli measured in grams.

Broccoli heads were removed from the stalk (shoot) of the plant directly below the last floret. The heads and the shoots of the broccoli were weighed in grams on the analytical balance. The broccoli head/shoot ratio was calculated by dividing head weight by shoot weight. The ratios were averaged, and error bars represent the standard deviation (FIG. 19). A one-way ANOVA comparing the head/shoot ratio in each treatment found that there is a significant difference between treatments (F=1.01E-06 ***). Specifically, for the biofertilizer (F.enc treatment), a Tukey post hoc test found that the comparisons that are significantly different are: F.enc-BC control (p=0.0301470) and F.enc-Control (p=0.0284981) (Table 2). Other statistical differences were found between Fert-BC Control (p=0.0000041), Fert-BCNB Control (p=0.0000161), Fert-Control (p=0.0000038) and Fert-P. rho (p=0.0045938) (Table 2).

TABLE 2

Tukey post hoc analysis of Broccoli head/shoot ratios

| | Ratio.treatment | | |
|---|---|---|---|
| | diff | lwr | upr |
| BCNB-BC | 0.0050998566 | −0.0314419816 | 0.04164169 |
| Control-BC | −0.0002698949 | −0.0368117331 | 0.03627194 |
| Fenc-BC | 0.0390403135 | 0.0024984752 | 0.07558215 |
| Fert-BC | 0.0746743730 | 0.0381325347 | 0.11121621 |
| Prho-BC | 0.0271987783 | −0.0093430600 | 0.06374062 |
| Control-BCNB | −0.0053697515 | −0.0419115898 | 0.03117209 |
| Fenc-BCNB | 0.0339404569 | −0.0026013814 | 0.07048230 |
| Fert-BCNB | 0.0695745164 | 0.0330326781 | 0.10611635 |
| Prho-BCNB | 0.0220989216 | −0.0144429166 | 0.05864076 |
| Fenc-Control | 0.0393102084 | 0.0027683701 | 0.07585205 |
| Fert-Control | 0.0749442679 | 0.0384024296 | 0.11148611 |
| Prho-Control | 0.0274686731 | −0.0090731651 | 0.06401051 |
| Fert-Fenc | 0.0356340595 | −0.0009077788 | 0.07217590 |
| Prho-Fenc | −0.0118415352 | −0.0483833735 | 0.02470030 |
| Prho-Fert | −0.0474755948 | −0.0840174330 | −0.01093376 |

| | p adj |
|---|---|
| BCNB-BC | 0.9982777 |
| Control-BC | 1.0000000 |
| Fenc-BC | 0.0301470 |
| Fert-BC | 0.0000041 |
| Prho-BC | 0.2495734 |
| Control-BCNB | 0.9977966 |
| Fenc-BCNB | 0.0821090 |
| Fert-BCNB | 0.0000161 |
| Prho-BCNB | 0.4734278 |
| Fenc-Control | 0.0284981 |
| Fert-Control | 0.0000038 |
| Prho-Control | 0.2400116 |
| Fert-Fenc | 0.0596721 |
| Prho-Fenc | 0.9256442 |
| Prho-Fert | 0.0045938 |

Example 3

Soil microbes interact with plant roots in a region called the rhizosphere, a space immediately surrounding the root hairs that is influenced by secretions released by the plant (Berendsen et al., 2012). This root-microbe interaction is known to play an important role in plant health and defence (Berendsen et al., 2012; Vessey, 2003). In addition to root secretions, the rhizosphere is also defined by the species of microbes that inhabit this zone (Berendsen et al., 2012; Vessey, 2003). Supplementing the soil near or at the rhizosphere using specific strains of bacteria may augment plant growth, plant productivity, plant defence against pathogens and disease, and hardiness in different or altering climates (Berendsen et al., 2012; Vessey, 2003). To ensure consistent and reproducible delivery of bacteria to the plant roots, biochar is used as a delivery vehicle (also referred to herein as an "inoculum carrier". Biochar, or pyrogenic organic matter, is a naturally occurring, eco-friendly material that improves soil fertility, regulates soil acidity, has the potential to remove heavy-metal contaminants (eg. cadmium) from the soil and reduce atmospheric $CO_2$ (Lehmann & Joseph, 2015; Chaney et al., 2999; Lenton and Vaughan, 2009). The effects of biochar on soil microbiology has become a subject of great interest to environmental and agricultural scientists. Particularly, biochar has been found to modify the populations of bacteria and fungi that inhabit the rhizosphere (Vecstaudza et al, 2017).

As described above, a formulation has been developed using biochar inoculated with a specific strain of bacteria, which was then mixed into soil at a specific ratio before planting seeds for germination. Results from a 9-week barley trial gave rise to an increased fruit to shoot ratio—the barley stalks were shorter in length, but the weight of the fruit was significantly heavier compared to the controls (no treatment or treatment with biochar alone). Without being bound by theory, these findings suggest that the strain of bacteria in the formulation encouraged the barley to redirect its nutritional resources to producing larger fruit instead of growing taller plants. In this example, the formulation is tested using collards, carrots and beans.

Collards, carrots and beans were planted and harvested. Statistically significant results were found between the collard average leaf weight among treatments and the collard leaf shoot ratio. The collards treated with the formulation (biochar and *F. enclensis*) produced a significantly larger average amount of leaves/vegetation (edible part) per plant compared to the control (no treatment, just soil), and followed a similar trend to our past results (seen in broccoli and barely), shorter shoots, producing a significantly larger fruit/leaf shoot ratio compared to the control (no treatment, just soil) and the biochar control (soil and biochar). A statistically significant difference was also found between the average carrot fresh weight and the treatment groups. The formulation (biochar+*F. enclensis*) produced significantly larger carrots compared to the control (no treatment, just soil) and the biochar control (biochar and soil). Statistical results are presented below.

Methods

Biochar and Bacteria Inoculation

The method was modified from Blatt-Janmaat (2018). The method was selected due to the fact that it is rapid and reproducible results have been achieved using this method in our research lab. The appropriate amount of pots per trial were sterilized using three rinsing stations prior to planting. The pots were bleached, then washed with soap and water, then rinsed and left to dry. 3.2 L of biochar was measured in a fume hood and autoclaved at 121° C. for 30 minutes. 2.4 L of 50% nutrient broth was prepared (5 g tryptone, 5 g sodium chloride, 3 g yeast extract in 1 L of water for 100% nutrient broth) and autoclaved at 121° C. for 30 minutes. After the nutrient broth autoclave cycles were complete, approximately 9.5 mL of the 50% nutrient broth was added to a 15 mL centrifuge tube. This step was repeated twice, resulting in 2 separate centrifuge tubes containing approximately 9.5 mL of 50% nutrient broth in each. Using a disposable inoculation loop a small amount (approximately one loop-full) of *Fictibacillus enclensis* was removed from an agar plate and then added to one of the centrifuge tubes. Approximately 50 microliters of *Pseudomonas rhodesiae* (a known plant growth-promoting bacteria (PGPB), for a comparison treatment) was removed from a frozen stock vial and added to the second centrifuge tube. Both of the centrifuge tubes were placed into a 30° C. incubator and allowed to grow for approximately 48-hours. Following the 48-hour growth period, 800 mL of the 50% nutrient broth was added to 800 mL of biochar to prepare the 1:1 biochar: nutrient broth control treatment. *Fictibacillus enclensis* was removed from the incubator and added to 800 mL of 50% nutrient broth. The 50% nutrient broth inoculated with *Fictibacillus enclensis* was added to 800 mL of biochar to prepare the *Fictibacillus enclensis* treatment. The same steps were followed for the *Pseudomonas rhodesiae* treatment (800 mL of 50% nutrient broth and 800 mL of biochar). The biochar/nutrient broth mixture and both of the biochar/nutrient broth bacteria mixtures were placed in a 30° C. incubator and shaken for several hours prior to starting the potting process. The remaining 800 mL of biochar was used for the biochar control treatment.

Figure 20:
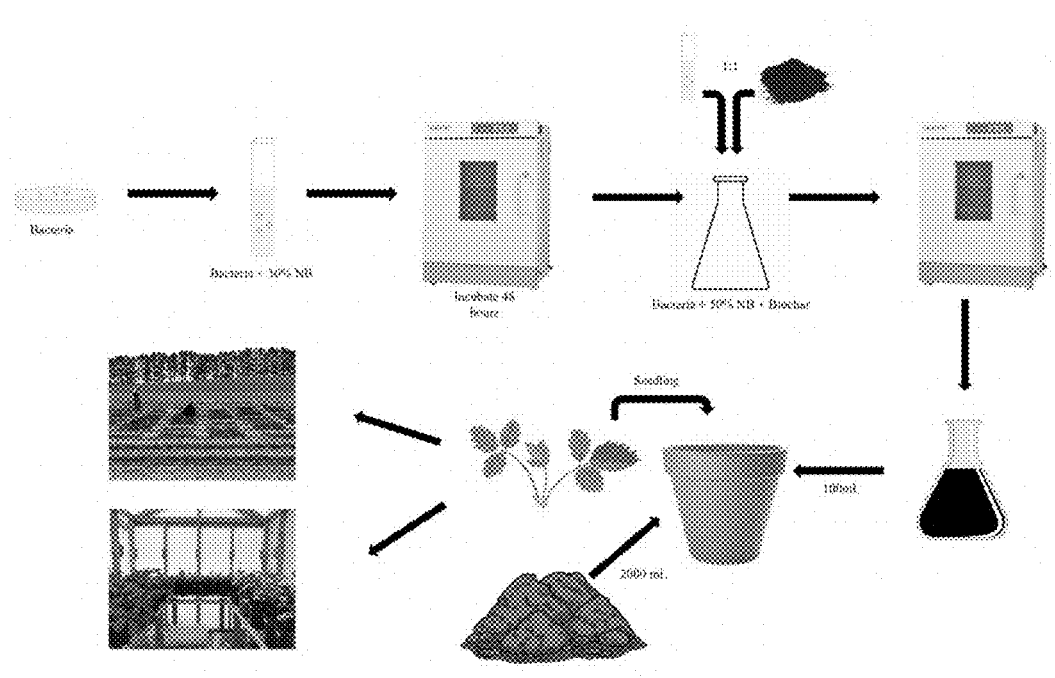
FIG. 20 shows a depiction of the method followed in Example 3.

All pots were sprayed with 70% ethanol prior to beginning the planting process. A 5% v/v biochar/soil (100 mL biochar/2000 mL soil) standard was mixed with an equal volume of 50% nutrient broth for each applicable treatment. Each of the trials (strawberries, blueberries, barley, carrots, collards, and beans) were composed of six treatments. Each of the treatments contained eight individual pots (n=48 per trial). The six treatments are: control, biochar control (BC), nutrient broth/biochar control (BCNB), conventional fertilizer control (Fert), *Fictibacillus enclensis* (F.enc) treatment and *Pseudomonas rhodesiae* (P.rho) treatment. For the control treatment and the fertilizer control treatment, 2000 mL of Nova Scotia topsoil was added into each pot and the seedling was planted. A 10-15-10 fertilizer was diluted with the appropriate volume of water (according to instructions on package) and added to the pots. Plants were fertilized every two weeks. To prepare the biochar control treatment group, 2000 mL of soil was mixed with 100 mL of biochar in each pot and the seedlings were planted. The nutrient broth/biochar control was prepared by mixing 2000 mL of Nova Scotia topsoil with 100 mL of 1:1 biochar:nutrient broth in each pot, followed by planting the seedling. The two bacteria treatments were prepared the same way as the nutrient broth/biochar control pots, except the appropriate bacteria nutrient broth/biochar mixture was used for each. To ensure adequate mixing of the soil, the soil was added in 1000 mL increments and mixed with 50 mL increments of the biochar/nutrient broth mixture into each pot at a time. Water was added to each pot prior to placing it in the greenhouse at Saint Mary's University. A depiction of the method is shown in FIG. 20.

Results

Collards

Figure 21:
FIG. 21 shows collards in the greenhouse, two weeks before harvest.

Collard seedlings were planted on Jun. 13, 2020 and harvested on Sep. 1, 2020. FIG. 21 shows collards in the greenhouse, two weeks before harvest. Collards were dried for two weeks prior to measuring the mass of the leaves or the stems (shoots). Statistically significant results were found between the collard average leaf weight per plant among treatments and the leaf shoot ratio. The plants treated with the formulation (biochar and *F. enclensis*) produced a significantly larger average amount of leaves per plant, and followed a similar trend to our past results (seen in broccoli and barely), shorter shoots, producing a significantly larger fruit/leaf shoot ratio compared to the Control (no treatment, just soil).

Average Leaf Weight of Collards

Figure 22:
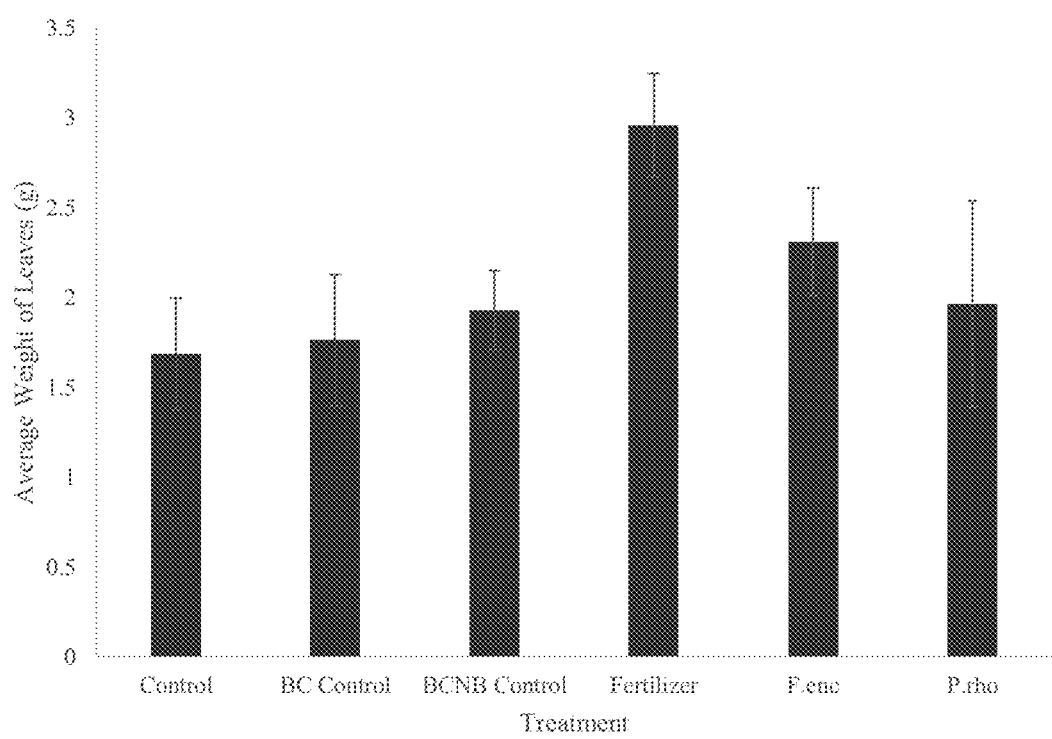
FIG. 22 shows a graph depicting average leaf weight of treated vs. non-treated harvested collards measured in grams.

Collards were harvested and then dried for two weeks prior to measuring the weight of the leaves. The leaves of each plant were removed from the stem and then weighed using an analytical balance (FIG. 22). A one-way ANOVA comparing the average dried weight in each treatment found that there is a significant difference between treatments (F=5.16e-07). A Tukey post hoc test found that the comparisons that are significantly different are: F.enc-Control (p=0.0244380), Fertilizer-BC Control (p=0.0000028), Fertilizer-BCNB Control (p=0.0000763), Fertilizer-Control (p=0.0000015), Fertilizer-P.rho (p=0.0000825) and Fert-F.enc (P=0.0171497).

3 samples were removed from statistical analysis: Control 7, Fertilizer 8 and BCNB 7 because they were outliers, so far off the norm/average (Control 7=0.4629 g, Fert 8=0.2422 g and BCNB=0.4913 g). Removing these decreased the standard deviation, increased the average of the Control, BCNB Control and Fertilizer control treatments and provided a more accurate representation of the results.

Statistical data from R is presented in Table 3. The significant differences detected between the strain *F. enclensis* and the control is highlighted in bold.

TABLE 3

Tukey post hoc analysis of Collard leaf weight

>Ratio<-read.csv(file.choose("LWFdata.csv"))
>Ratio.Treatment<-Ratio$Treatment
>Ratio.Leafweight<-Ratio$Leafweight
>Ratio.anova<-aov(Ratio.Leafweight~Ratio.Treatment)
>summary(Ratio.anova)
Df Sum Sq Mean Sq F value Pr(>F)
Ratio.Treatment 5 7.949 1.590 11.86 5.16e−07 ***
Residuals 39 5.227 0.134
—
Signif. codes: 0 '*' 0.001 '' 0.01 '*' 0.05 '.' 0.1 ' ' 1
3 observations deleted due to missingness
>TukeyHSD(Ratio.anova)
Tukey multiple comparisons of means
95% family-wise confidence level
Fit: aov(formula = Ratio.Leafweight~Ratio.Treatment)

| | $Ratio.Treatment | | | |
|---|---|---|---|---|
| | diff | lwr | upr | p adj |
| BCNB-BC | 0.16441071 | −0.403222342 | 0.7320438 | 0.9519318 |
| Control-BC | −0.07694643 | −0.644579485 | 0.4906866 | 0.9984675 |
| F.enc-BC | 0.54553750 | −0.002848131 | 1.0939231 | 0.0518842 |

TABLE 3-continued

Tukey post hoc analysis of Collard leaf weight

| Fert-BC | 1.19388214 | 0.626249087 | 1.7615152 | 0.0000028 |
| P.rho-BC | 0.20182500 | −0.346560631 | 0.7502106 | 0.8773135 |
| Control-BCNB | −0.24135714 | −0.827606042 | 0.3448918 | 0.8178171 |
| F.enc-BCNB | 0.38112679 | −0.186506270 | 0.9487598 | 0.3544534 |
| Fert-BCNB | 1.02947143 | 0.443222529 | 1.6157203 | 0.0000763 |
| P.rho-BCNB | 0.03741429 | −0.530218770 | 0.6050473 | 0.9999550 |
| F.enc-Control | 0.62248393 | 0.054850873 | 1.1901170 | 0.0244380 |
| Fert-Control | 1.27082857 | 0.684579672 | 1.8570775 | 0.0000015 |
| P.rho-Control | 0.27877143 | −0.288861617 | 0.8464045 | 0.6838987 |
| Fert-F.enc | 0.64834464 | 0.080711587 | 1.2159777 | 0.0171497 |
| P.rho-F.enc | −0.34371250 | −0.892098131 | 0.2046731 | 0.4304872 |
| P.rho-Fert | −0.99205714 | −1.559690199 | −0.4244241 | 0.0000825 |

Collard Leaf Shoot Ratio

Figure 23:
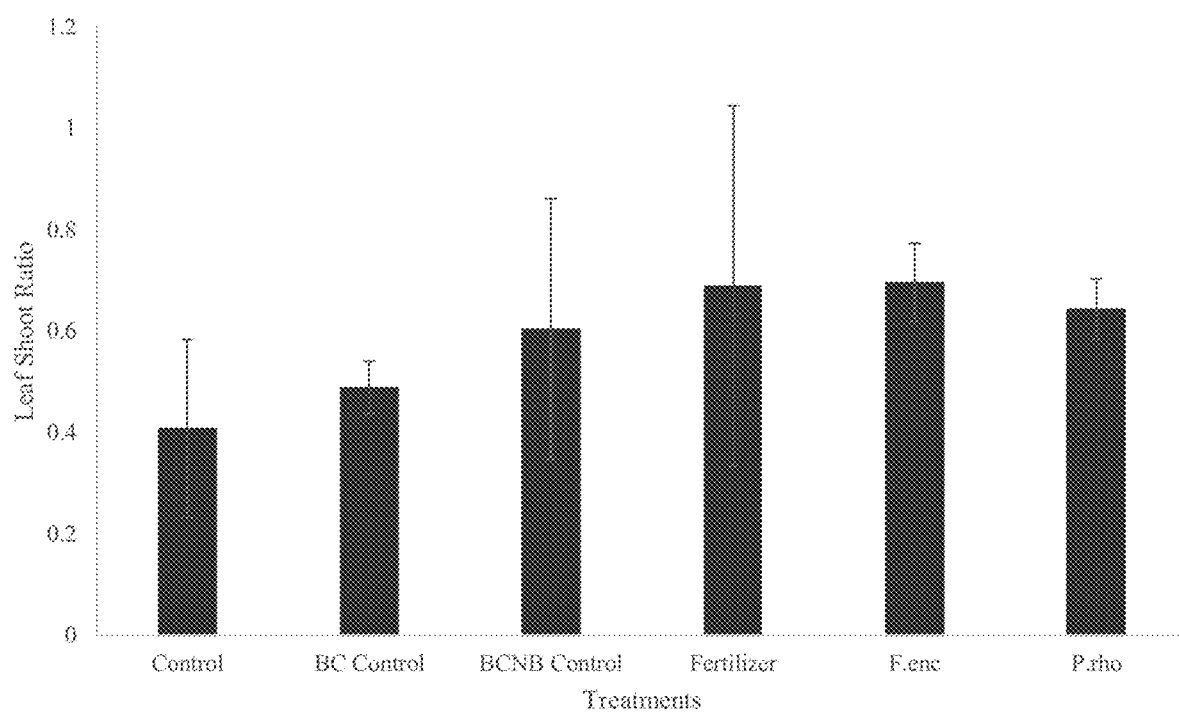
FIG. 23 shows a graph depicting the leaf short ratio of treated vs. non-treated harvested collards.

Collards were harvested and then dried for two weeks prior to measuring the weight of the leaves and shoots (stem). The leaves of each plant were removed from the stem and then weighed using an analytical balance. The shoots (stems) were also weighed using the analytical balance. The leaf shoot ratio was calculated by dividing leaf weight by shoot weight (FIG. 23). A one-way ANOVA comparing the average dried weight in each treatment found that there is a significant difference between treatments (F=8.8e-06). A Tukey post hoc test found that the comparisons that are significantly different are: F.enc-BC Control (p=0.0090209), F.enc-Control (p=0.0044362), Fertilizer BC Control (p=0.0001276), Fertilizer-Control (p=0.0000674), BCNB Control-BC (p=0.0167506), Control-BCNB (p=0.0083732), and P.rho-Control (p=0.0474529).

Statistical data from R is presented below (Table 4). The comparisons that are significantly different are highlighted in bold.

TABLE 4

Tukey post hoc analysis of Collard leaf shoot ratio

>Ratio<-read.csv(file.choose("LSRatio.csv"))
>Ratio.Treatment<-Ratio$Treatment
>Ratio.Leafshoot<-Ratio$Leafshoot
>Ratio.anova<-aov(Ratio.Leafshoot~Ratio.Treatment)
>summary(Ratio.anova)
Df Sum Sq Mean Sq F value Pr(>F)
Ratio.Treatment 5 0.5829 0.11657 9.064 8.8e−06 ***
Residuals 39 0.5016 0.01286
—
Signif. codes: 0 '*' 0.001 '' 0.01 '*' 0.05 '.' 0.1 ' ' 1
3 observations deleted due to missingness
>TukeyHSD(Ratio.anova)
Tukey multiple comparisons of means
95% family-wise confidence level
Fit: aov(formula = Ratio.Leafshoot~Ratio.Treatment)

| | $Ratio.Treatment | | | |
|---|---|---|---|---|
| | diff | lwr | upr | p adj |
| BCNB-BC | 0.201375990 | 0.025528710 | 0.37722327 | 0.0167506 |
| Control-BC | −0.022193615 | −0.198040895 | 0.15365366 | 0.9989132 |
| Fenc-BC | 0.207593196 | 0.037708584 | 0.37747781 | 0.0090209 |
| Fert-BC | 0.299134763 | 0.123287483 | 0.47498204 | 0.0001276 |
| Prho-BC | 0.154937888 | −0.014946724 | 0.32482250 | 0.0914553 |
| Control-BCNB | −0.223569605 | −0.405183894 | −0.04195532 | 0.0083732 |
| Fenc-BCNB | 0.006217207 | −0.169630073 | 0.18206449 | 0.9999980 |
| Fert-BCNB | 0.097758773 | −0.083855516 | 0.27937306 | 0.5954173 |
| Prho-BCNB | −0.046438101 | −0.222285381 | 0.12940918 | 0.9673928 |
| Fenc-Control | 0.229786812 | 0.053939532 | 0.40563409 | 0.0044362 |
| Fert-Control | 0.321328378 | 0.139714089 | 0.50294267 | 0.0000674 |
| Prho-Control | 0.177131504 | 0.001284224 | 0.35297878 | 0.0474529 |

TABLE 4-continued

Tukey post hoc analysis of Collard leaf shoot ratio

| Fert-Fenc | 0.091541567 | −0.084305713 | 0.26738885 | 0.6289812 |
|---|---|---|---|---|
| Prho-Fenc | −0.052655308 | −0.222539920 | 0.1172293 | 0.9366499 |
| Prho-Fert | −0.144196875 | −0.320044154 | 0.03165040 | 0.1623951 |

Carrots

Figure 24:
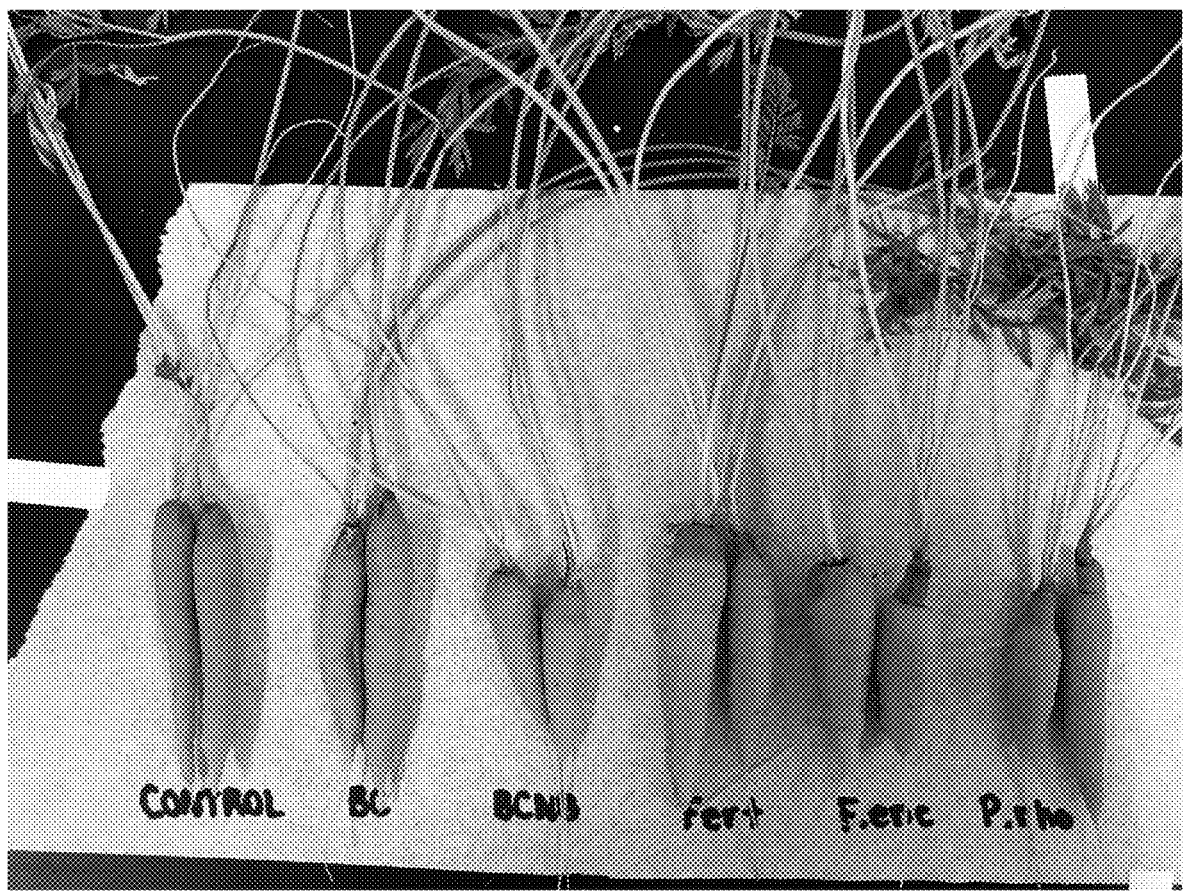
FIG. 24 shows images of treated vs. non-treated harvested carrots.

Carrots were planted on Jun. 13, 2020, and harvested on Sep. 25, 2020. Carrots were planted as seeds and not seedlings, so three seeds were planted originally, and the pots were thinned to two carrots per pot. Sixteen carrots were harvested in each of the six treatments. There was a lot of variation among the weight of the carrots in each treatment, so the largest eight carrots from each treatment were selected for statistical analysis, to reduce standard deviation and provide a more accurate representation of the yield. A statistically significant difference was found between the average carrot fresh weight and the treatment groups. The formulation (Biochar+*F. enclensis*) produced significantly larger carrots compared to the control (no treatment, just soil) and the biochar control (biochar and soil). Results are presented in FIG. 24 which shows from left to right: Control, Biochar control, biochar/nutrient broth control, fertilizer control, *F. enclensis* treatment and *P. rhodesiae* treatment. Upon initial observation, the carrots treated with *F. enclensis* produced shorter and wider carrots in comparison to the control, which is a similar trend that we have noticed in the shoots of other plants. Table 5 shows the fresh weight of each harvested carrot in grams.

TABLE 5

The fresh weight of each harvested carrot in grams. The bolded weights are the ones that were used for the statistical analysis.

| Control | Biochar Control | Biochar/ Nutrient Broth Control | Fertilizer Control | F. enclensis | P. rhodesiae |
|---|---|---|---|---|---|
| 5.81 | 5.19 | 8.49 | 12.10 | 10.21 | 6.91 |
| 5.59 | 5.52 | 8.38 | 11.69 | 11.36 | 4.80 |
| 5.70 | 4.11 | 4.72 | 7.95 | 8.88 | 7.05 |
| 5.18 | 7.41 | 6.73 | 4.67 | 7.59 | 6.19 |
| 3.42 | 6.52 | 6.84 | 9.92 | 8.39 | 5.90 |
| 5.97 | 4.10 | 4.95 | 5.02 | 6.67 | 3.90 |
| 5.20 | 3.81 | 3.24 | 4.22 | 5.84 | 3.89 |
| 3.11 | 4.58 | 3.37 | 8.62 | 4.99 | 4.31 |
| 4.53 | 4.85 | 4.56 | 10.46 | 4.85 | 3.90 |
| 4.45 | 4.13 | 4.72 | 3.12 | 5.42 | 2.74 |
| 3.23 | 3.08 | 3.63 | 10.25 | 4.90 | 2.58 |
| 5.07 | 2.27 | 3.69 | 11.89 | 3.81 | 2.21 |
| 2.09 | 3.25 | 2.29 | 4.41 | 4.48 | 2.97 |
| 6.14 | 2.74 | 2.04 | 4.31 | 4.51 | 2.47 |
| 4.05 | 2.93 | 2.11 | 4.57 | 3.64 | 1.72 |
| 3.25 | 2.29 | 1.98 | 4.64 | 2.45 | 0.85 |

Figure 25:
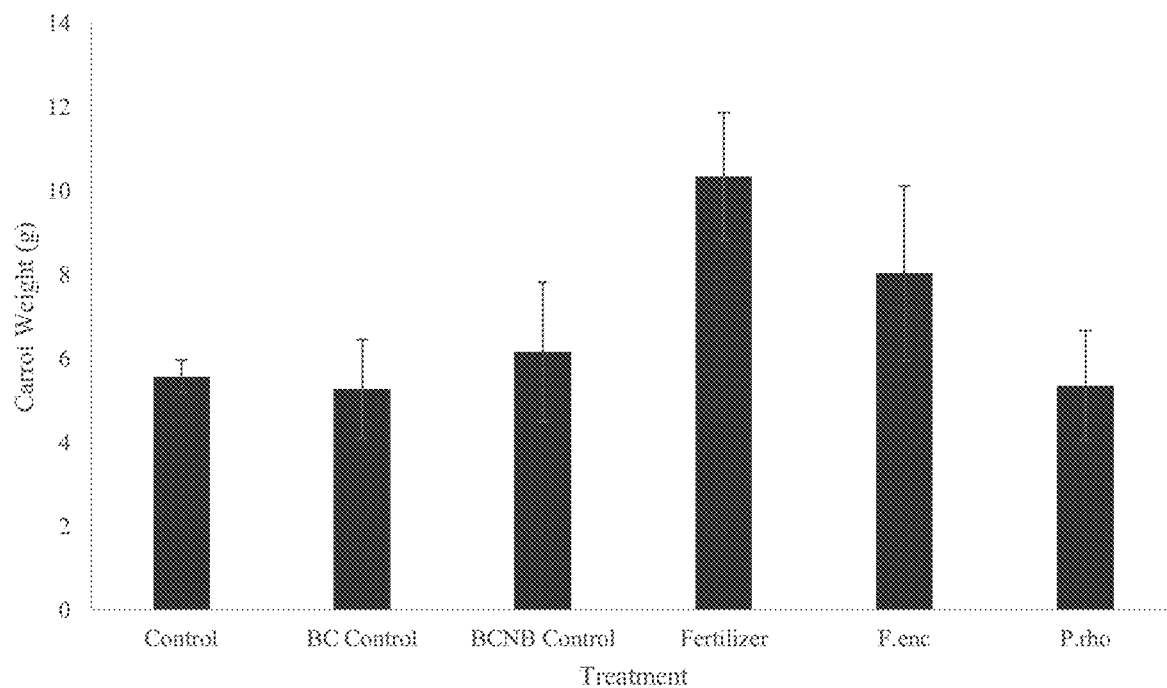
FIG. 25 shows a graph depicting the average fresh weight of treated vs. non-treated carrots in grams.

FIG. 25 shows the average fresh weight of carrots measured in grams. Carrots were harvested, washed and dried thoroughly to ensure all dirt was removed. The carrot tops (greens) were removed prior to weighing. Fresh weight of each carrot was measured. Sixteen carrots were harvested in each treatment group. The top eight largest carrots were used for statistical analysis. A one-way ANOVA comparing the average fresh weight in each treatment found that there is a significant difference between treatments ($F=1.21e-08$). A Tukey post hoc test found that the comparisons that are significantly different are: F.enc BC Control ($p=0.0056903$), F.enc-Control ($p=0.0176901$), Fertilizer-BC Control ($p=0.0000002$), Fertilizer-Control ($p=0\ 0.0000008$), Fertilizer-P.rho ($p=0.0000003$), F.enc P.rho ($p=0.0079323$) and between Fert-F.enc ($p=0.0300436$).

Statistical data from R is presented in Table 6. As mentioned previously the eight largest carrots from each treatment were used to decrease the standard deviation and the variation in weight. The comparisons that are significantly different are highlighted in bold.

TABLE 6

Tukey post hoc analysis of carrot fresh weight

```
>Ratio<-read.csv(file.choose("CWdata.csv"))
>Ratio.Treatment<-Ratio$Treatment
>Ratio.Weight<-Ratio$Weight
>Ratio.anova<-aov(Ratio.Weight~Ratio.Treatment)
>summary(Ratio.anova)
         Df Sum Sq Mean Sq F value  Pr(>F)
Ratio.Treatment  5 163.51  32.70   15.53 1.21e-08 ***
Residuals       42  88.44   2.11

Signif. codes:  0 '***' 0.001 '**' 0.01 '*' 0.05 '.' 0.1 ' ' 1
>TukeyHSD(Ratio.anova)
  Tukey multiple comparisons of means
    95% family-wise confidence level
Fit: aov(formula = Ratio.Weight~Ratio.Treatment)
```

$Ratio.Treatment

| | diff | lwr | upr | p adj |
|---|---|---|---|---|
| BCNB-BC | 0.88875 | −1.277179 | 3.054679 | 0.8222222 |
| Control-BC | 0.29750 | −1.868429 | 2.463429 | 0.9984044 |
| F.enc-BC | 2.76000 | 0.594071 | 4.925929 | 0.0056903 |
| Fert-BC | 5.07500 | 2.909071 | 7.240929 | 0.0000002 |
| P.rho-BC | 0.08500 | −2.080929 | 2.250929 | 0.9999967 |
| Control-BCNB | −0.59125 | −2.757179 | 1.574679 | 0.9631658 |
| F.enc-BCNB | 1.87125 | −0.294675 | 4.037179 | 0.1251454 |
| Fert-BCNB | 4.18625 | 2.020321 | 6.352179 | 0.0000121 |
| P.rho-BCNB | −0.80375 | −2.969679 | 1.362179 | 0.8754156 |
| F.enc-Control | 2.46250 | 0.296571 | 4.628429 | 0.0176901 |
| Fert-Control | 4.77750 | 2.611571 | 6.943429 | 0.0000008 |
| P.rho-Control | −0.21250 | −2.378429 | 1.953429 | 0.9996880 |
| Fert-F.enc | 2.31500 | 0.149071 | 4.480929 | 0.0300436 |
| P.rho-F.enc | −2.67500 | −4.840929 | −0.509071 | 0.0079323 |
| P.rho-Fert | −4.99000 | −7.155929 | −2.824071 | 0.0000003 |

Beans

Figure 26:
FIG. 26 shows bean plants in the greenhouse, two weeks before initial harvest.
Figure 27:
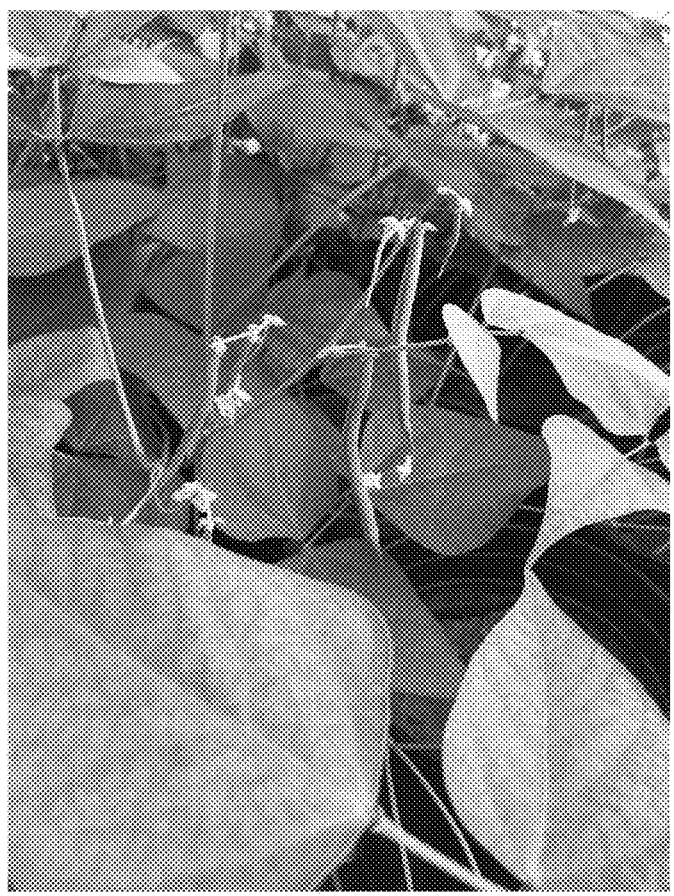
FIG. 27 shows images of bean pods.

Beans were planted on Jun. 27, 2020 and the plants were harvested twice. Beans were planted as seeds and not seedlings, three seeds were planted originally, and the pots were thinned to two bean plants per pot. Beans were harvested in the beginning of September and mid-September 2020. FIG. 26 shows bean plants in the greenhouse, two weeks before initial harvest. The weight of the bean pods were totaled together for each treatment and the results were analyzed using the weights of 8 randomly selected bean pods per treatment to determine the average bean weight in each of the six treatment groups. FIG. 27 shows a bean pod. No noticeable differences in size of the bean pods between treatments.

No statistical differences were found between the average bean weight and the treatment groups. Results are presented in Tables 7 and 8.

TABLE 7

Total number of beans produced.

|  | Control | BC Control | BCNB Control | Fertilizer | F.enc | P.rho |
|---|---|---|---|---|---|---|
| Total # of Beans | 37 | 36 | 25 | 54 | 47 | 30 |

TABLE 8

Total fresh weight of beans measured in grams.

|  | Control | BC Control | BCNB Control | Fertilizer | F.enc | P.rho |
|---|---|---|---|---|---|---|
| Total Fresh Weight(g) | 112.39 | 88.83 | 77.23 | 156.2 | 141.38 | 101.24 |

Figure 28:
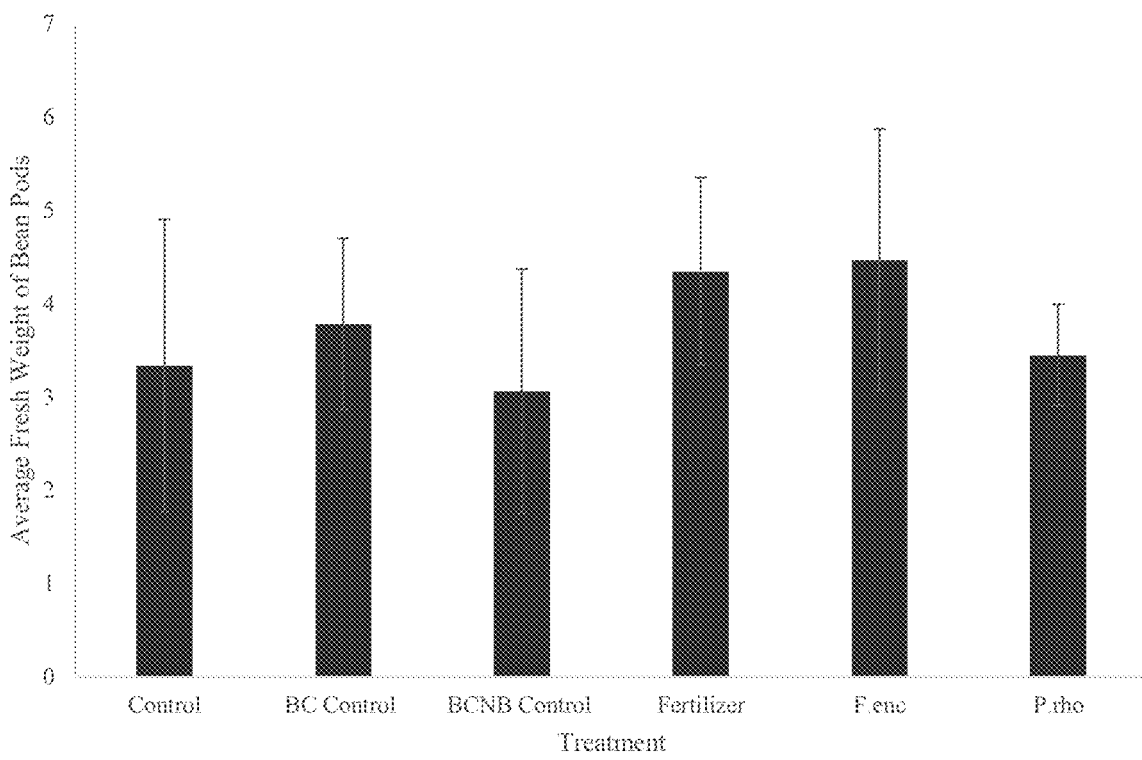
FIG. 28 shows a graph depicting the average fresh weight of treated vs. non-treated bean pods.

Eight randomly selected bean pods from each of the six treatments were weighed to compare the average bean weight among treatment groups. Although the pots treated with *Fictibacillus enclensis* did produce more beans and a much larger total mass of beans compared to the control (141.38 g to 112.39 g), no significant differences were found between the weights of the bean pods and the treatment groups. The results are presented in FIG. 28 which shows the average fresh weight of bean pods. Bean pods were cleaned and wiped with paper towel to ensure they were clean prior to weighing. Eight bean pods were randomly selected from each treatment for statistical analysis. A one-way ANOVA detected no significant differences among average bean weight between treatment groups.

Statistical data from R is presented in Table 9.

TABLE 9

Tukey post hoc analysis of bean pod fresh weight

>Ratio<-read.csv(file.choose("Beanweight.csv"))
>Ratio.Treatment<-Ratio$Treatment
>Ratio.Weight<-Ratio$Weight
>Ratio.anova<-aov(Ratio.Weight~Ratio.Treatment)
>summary(Ratio.anova)
Df Sum Sq Mean Sq F value Pr(>F)
Ratio.Treatment 5 12.85 2.570 1.867 0.121
Residuals 42 57.81 1.376
>TukeyHSD(Ratio.anova)
Tukey multiple comparisons of means
95% family-wise confidence level
Fit: aov(formula = Ratio.Weight~Ratio.Treatment)

| $Ratio.Treatment | | | |
|---|---|---|---|
|  | diff | lwr | upr |
| BCNB-BC | −0.71875 | −2.4698932 | 1.0323932 |
| Control-BC | −0.44875 | −2.1998932 | 1.3023932 |
| F.enc-BC | 0.68625 | −1.0648932 | 2.4373932 |
| Fert-BC | 0.56250 | −1.1886432 | 2.3136432 |
| P.rho-BC | −0.33375 | −2.0848932 | 1.4173932 |
| Control-BCNB | 0.27000 | −1.4811432 | 2.0211432 |
| F.enc-BCNB | 1.40500 | −0.3461432 | 3.1561432 |
| Fert-BCNB | 1.28125 | −0.4698932 | 3.0323932 |
| P.rho-BCNB | 0.38500 | −1.3661432 | 2.1361432 |
| F.enc-Control | 1.13500 | −0.6161432 | 2.8861432 |
| Fert-Control | 1.01125 | −0.7398932 | 2.7623932 |
| P.rho-Control | 0.11500 | −1.6361432 | 1.8661432 |
| Fert-F.enc | −0.12375 | −1.8748932 | 1.6273932 |
| P.rho-F.enc | −1.02000 | −2.7711432 | 0.7311432 |
| P.rho-Fert | −0.89625 | −2.6473932 | 0.8548932 |

TABLE 9-continued

Tukey post hoc analysis of bean pod fresh weight

|  | p adj |
|---|---|
| BCNB-BC | 0.8220536 |
| Control-BC | 0.9718845 |
| F.enc-BC | 0.8484347 |
| Fert-BC | 0.9281842 |
| P.rho-BC | 0.9925304 |
| Control-BCNB | 0.9972308 |
| F.enc-BCNB | 0.1812661 |
| Fert-BCNB | 0.2665417 |
| P.rho-BCNB | 0.9856869 |
| F.enc-Control | 0.3960862 |
| Fert-Control | 0.5243000 |
| P.rho-Control | 0.9999568 |
| Fert-F.enc | 0.9999379 |
| P.rho-F.enc | 0.5148923 |
| P.rho-Fert | 0.6487262 |

Example 4

Plant Growth Promoting Properties of *F. enclensis*
IAA Test

Indole-3-acetic acid (IAA) is a phytohormone that is considered to be the most important native auxin. IAA is a signal molecule that functions in the regulation of plant development. When plants are inoculated with bacterial species that have the ability to produce IAA, the nutrient uptake of the plant is enhanced (Fu et al., 2015).

Figure 29:
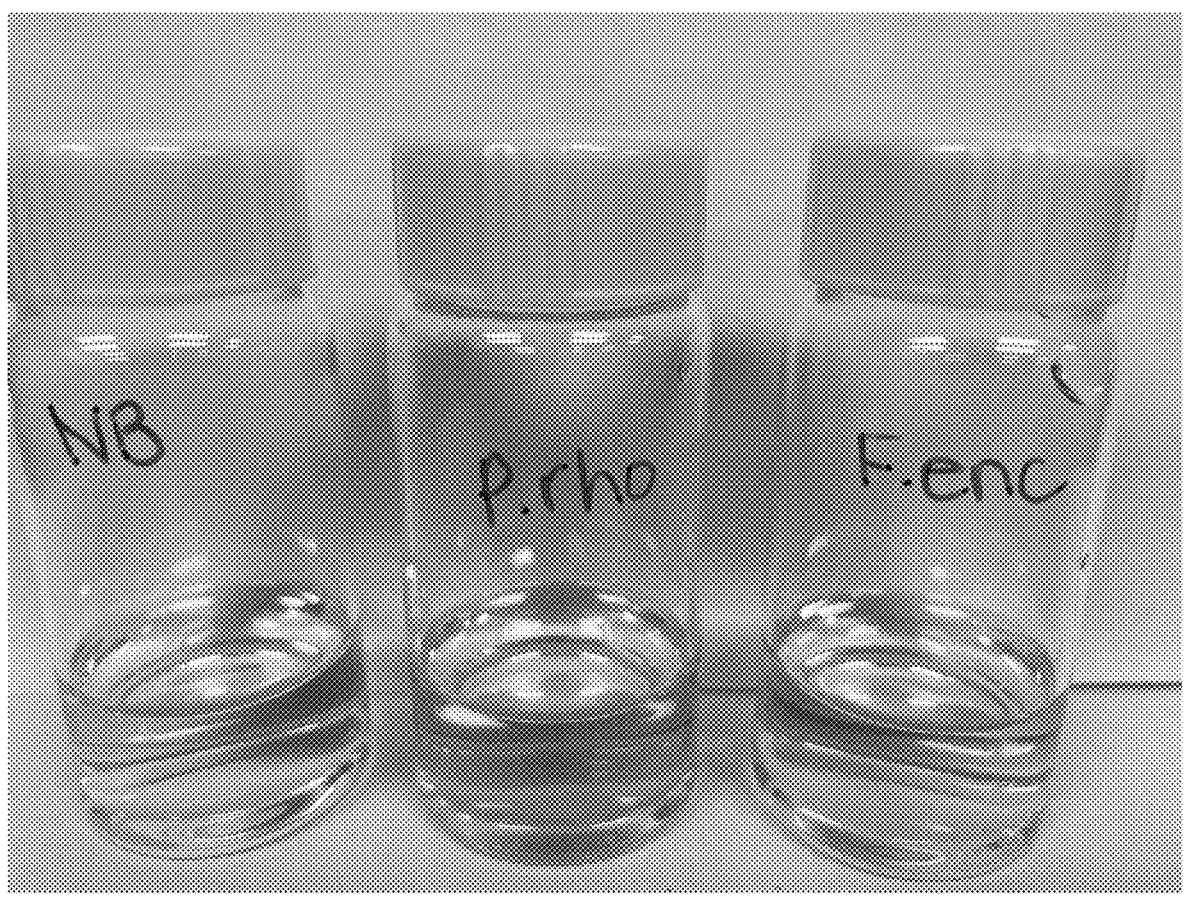
FIG. 29 shows production of Indole-3-acetic acid (IAA) by *F. enclensis*.
Figure 30:
FIG. 30 also shows production of Indole-3-acetic acid (IAA) by *F. enclensis*.

FIG. 29 shows from left to right: Nutrient broth (control), *Pseudomonas rhodesiae* (P.rho), *Fictibacillus enclensis* (F.enc). A pink color indicates a positive test for indole-3-acetic acid. There is a slight pink-peach tint in both P.rho and F.enc, which indicates a low concentration of IAA. FIG. 30 shows the same results as FIG. 29: from left to right: Nutrient broth (control), *Pseudomonas rhodesiae* (P.rho), *Fictibacillus enclensis* (P.rho).
Siderophore Test P.rho was selected as control for this test because it has been identified as a bacterium with plant growth promoting properties and has the ability to utilize/produce siderophores, so it was selected as a control for a Blue Agar CAS Assay for Siderophore Detection. A yellow halo surrounding the colonies identifies a positive test for siderophore production.

Figure 31A:
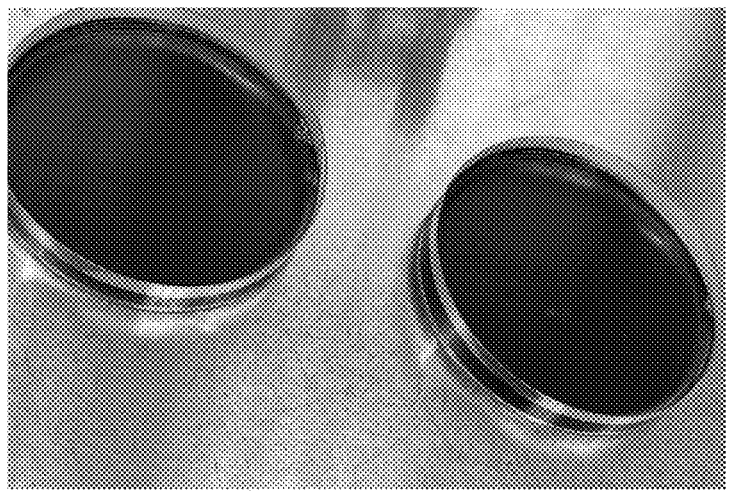
FIG. 31 (A-C) shows the results of a blue agar CAS assay for siderophore detection for P. Rho and F. enc.

FIG. 31A shows CAS agar plates with a deep blue colour prior to inoculation with bacteria.

Figure 31B:
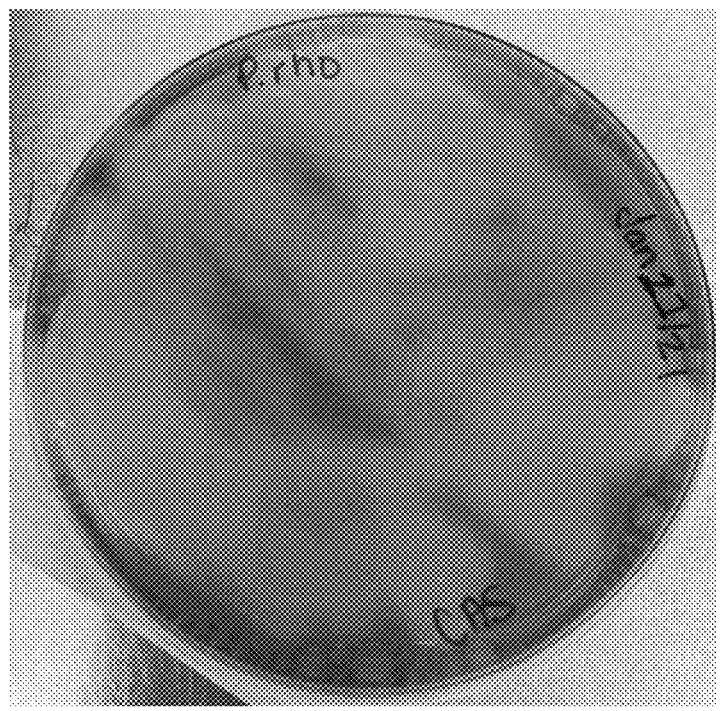

FIG. 31B shows CAS agar plate inoculated with *Pseudomonas rhodesiae* (P.rho). A yellow halo surrounding the colonies identifies a positive test for siderophore production. As can be seen in FIG. 31B, a yellow halo surrounds all of the bacterial colonies and the agar has shifted from a deep blue to a green.

Figure 31C:

FIG. 31C shows CAS agar plates inoculated with *Fictibacillus enclensis* (F.enc). A yellow halo surrounding the colonies identifies a positive test for siderophore production. In comparison to the control plates (plates inoculated with P.rho; FIG. 31B), the yellow halo formation around each colony is much more subtle. A faint yellow tint surrounds each colony suggesting that F.enc produces siderophores but at a lower concentration in comparison to P.rho.
Nitrogen Fixation Test

Figure 32A:
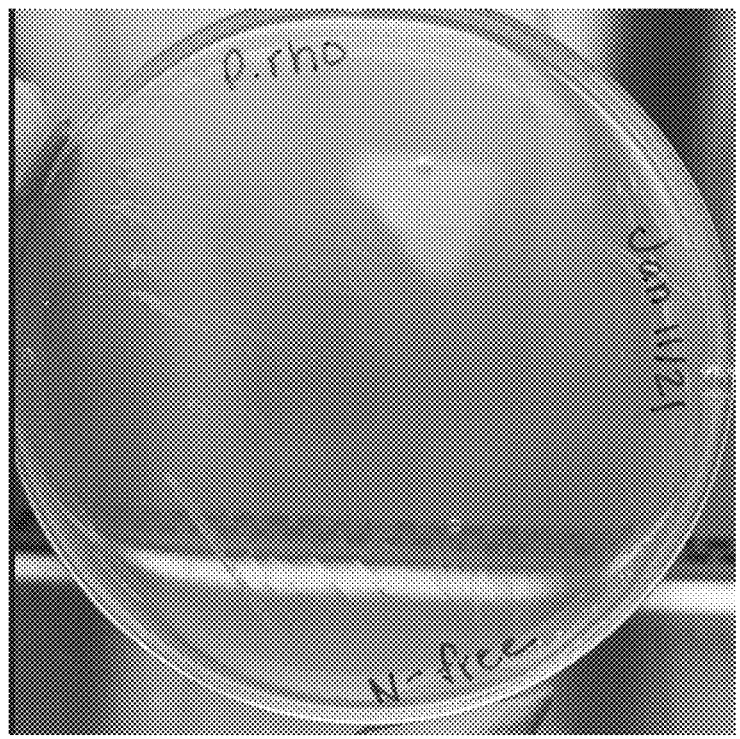
FIG. 32 (A, B) shows the results of a nitrogen fixation test for P. Rho and F. enc.

*Pseudomonas rhodesiae* (P.rho) was selected as a control for this test because it has the ability to fix nitrogen. FIG. 32A shows a nitrogen-free media agar plate inoculated with P.rho. Growth indicates a positive test and the ability of the bacteria to fix nitrogen. Small colony growth can be observed on the agar plate. Normally P.rho is grown on a nutrient agar plate (tryptone+sodium chloride+yeast extract+agar), so one would expect the growth on two different agar to be very diverse as the bacteria are forced to use a different source of carbon.

Figure 32B:

FIG. 32B shows a nitrogen-free media agar plate inoculated with *Fictibacillus enclensis* (F.enc). Growth indicates a positive test and the ability of the bacteria to fix nitrogen. Very tiny colonies can be observed on the bottom half of the agar plate indicating a positive test result. The Norris Glucose Nitrogen Free Medium from HIMEDIA that was used for this test produces a slight precipitate, due to the presence of calcium carbonate which can be observed in the center of the agar plate, making a slightly more difficult to detect colony growth. The precipitate made it extremely difficult to observe growth in the liquid media tubes. Similar to P.rho, F.enc is typically grown on a nutrient agar plate (tryptone+sodium chloride+yeast extract+agar), so one would expect the growth on two different agar to be very diverse as the bacteria are forced to use a different source of carbon.

Example 5

Co-culturing *F. enclensis* with other Plant Growth Promoting Bacteria (PGPB) isolated from grape vines The synergistic plant growth promoting ability of co-culturing *F. enclensis* with other Plant Growth Promoting microorganisms isolated from an organic vineyard is studied. The bacteria are first screened for their ability to co-exist and their interaction. Pairs that are not inhibitory are grown individually in nutrient broth and relative volumes are added to biochar, or directly into the soil. Crops used for this study include carrots, turnips and strawberries. Treatment groups are as follows; control (only soil), biochar control (biochar+soil), biochar with nutrient broth, nutrient broth and single bacteria, nutrient broth and cocultured bacteria and fertilizer. In addition to other methods of measuring plant growth, nutritional properties are also measured.

PGP bacteria are observed to have a synergistic effect on plant growth compared to single inoculation. Adding bacteria to biochar is more beneficial than adding bacteria in nutrient broth directly to the soil, due to the added benefits of biochar on plant growth and the ability for biochar to promote bacteria growth and mobilization to plant roots. Additionally, due to increase in crop size, crop nutritional content also increases.

Inoculating soil more than once with biochar-bacteria formulation

Multiple inoculations of bacteria to the soil leads to enhanced growth surpassing the fertilizer treatment. Control, fertilizer and biochar-bacteria treatments are set up. Fertilizer is applied as directed. For the biochar-bacteria treatment, nutrient broth with bacteria is added to the topsoil once, twice etc., until it has equaled the same number of times as the fertilizer treatment; this is dependent on the crop selected. Treatment are then compared for increased plant growth.

Inoculating Seeds with *F. enclensis*

There are benefits to directly applying biofertilizer to the seed. Firstly, microorganisms are delivered directly to the rhizosphere (there would be no need for mobilization of bacteria), this may lead to more microbe-plant interaction and eliminate the time required between planting and bacteria mobilization. In addition, seeds may also require less microbial biomass when compared to mixing biofertilizer with soil; this would be more cost effective. Biopriming is used to apply bacteria to the seed. This method involves sterilizing seeds and immersing them in the microbial suspension (nutrient broth+*F. enclensis*) for a certain length of time (to be determined) and then drying the seeds to prevent germination. Some seeds are randomly selected and cultured on to a nutrient agar medium to test for bacteria viability. This method is compared to other treatments such as the biochar-bacteria treatment and the fertilizer treatment. Upon successfully coating seed with bacteria, this treatment leads to an increase in plant growth when compared to the control (only soil).

REFERENCES

1. Agegnehu G, Srivastava A K, Bird M I. The role of biochar and biochar-compost in improving soil quality and crop performance: A review. Appl Soil Ecol. 2017; 119:156-170.
2. Alonso E B, Cockx L, Swinnen J. Culture and food security ☆. Glob Food Sec. 2018; 17:113-127.
3. Battini et al. Multifunctionality and diversity of culturable bacterial communities strictly associated with spores of the plant beneficial symbiont *Rhizophagus intraradices*. Microbiol Res. 2016; 183:68-79.
4. Bennett E, Roberts J A, Wagstaff C. Manipulating resource allocation in plants. J Exp Bot. 2012; 63(9): 3391-3400.
5. Campbell et al. Reducing risks to food security from climate change. Glob Food Sec. 2016; 11:34-43.
6. Delmer D. Agriculture in the developing world: Connecting innovations in plant research to downstream applications. PNAS. 2005; 102(44):15739-15746.
7. FAO. Food Security. Policy Brief. 2006; 2. http://www.fao.org/fileadmin/templates/faoitaly/documents/pdf/pdf_Food_Security_Cocept_Note.pdf
8. Fuss et al. Global food security & adaptation under crop yield volatility. Technol Forecast Soc Change. 2018; 98:223-233.
9. Gamiz et al. Assessing the effect of organoclays and biochar on the fate of abscisic acid in soil. J Agric Food Chem. 2017; 65:29-38.
10. Gatehouse et al. Insect-resistant biotech crops and their impacts on beneficial arthropods. Philos Trans R Soc Lond B Biol Sci. 2011; 366(1569):1438-1452.
11. Geisseler D, Scow K M. Long-term effects of mineral fertilizers on soil microorganisms—A review. Soil Biol Biochem. 2014; 75:54-63.
12. Han et al. Characterization of a novel plant growth-promoting bacteria strain *Delftia tsuruhatenesis* HR4 both and a diazotroph and a potential biocontrol agent against various plant pathogens. Syst Appl Microbiol. 2005; 28(1):66-76.
13. He et al. Particle size dependence of the physicochemical properties of biochar. Chemosphere. 2018:212:385-392.
14. Jiao et al. Environmental risks of trace elements associated with long-term phosphate fertilizers applications: A review. Environ Pollut. 2012; 168:44-53.
15. Kidd P S, Proctor J. Why plants grow poorly on very acid soils: are ecologists missing the obvious? J Exp Bot. 2001; 52(357):791-799.
16. Kumar A, Verma J P. Does plant-microbe interaction confer stress tolerance in plants: A review? Microbial Res. 2018; 207:41-52.

17. Liao, W, Thomas S C. Biochar Particle Size and Post-Pyrolysis Mechanical Processing Affect Soil pH, Water Retention Capacity, and Plant Performance. Soil Syst. 2019:3(1):14
18. Liu et al. Genotypic difference in the influence of aluminum and low pH on ion flux, rhizopheric pH and ATPase activity between Tibetan wild and cultivated barley. Environ Exp Bot. 2018; 156:16-24.
19. Megali L, Schlau B, Rasmann S. Soil microbial inoculation increases corn yield and insect attack. Agron Sustainable Dev. 2015; 35(4):1511-1519.
20. Morgan J A W, Bending G D, White P J. Biological costs and benefits to plant-microbe interactions in the rhizosphere. J Exp Bot. 2005; 56(417):1729-1739.
21. Pathan A K, Bond J, Gaskin R E. Sample preparation for SEM of plant surfaces. Materials Today. 2010; 12:32-43.
22. Patten C L, Glick B R. Bacterial biosynthesis of indole-3-acetic acid. Can J Microbiol. 1996; 42:207-220.
23. Prosekov A Y, Ivanova S A. Food security: The challenge of the present. Geoforum. 2018; 91: 73-77.
24. Qambrani et al. Biochar properties and eco-friendly applications for climate change mitigation, waste management, and wastewater treatment: A review. Renew Sust Energ Rev. 2017; 79:255-273.
25. Ramakrishna et al. Plant growth promoting bacteria in agriculture: Two sides of a coin. Appl Soil Ecol. 2019: 138:10-18.
26. Rehman et al. Contrasting effects of biochar, compost and farm manure on alleviation of nickel toxicity in maize (*Zea mays* L.) in relation to plant growth, photosynthesis and metal uptake. Ecotoxicol Environ Saf. 2016; 133: 218-225.
27. Rizwan et al. Residual effects of biochar on growth, photosynthesis and cadmium uptake in rice (*Oryza sativa* L.) under Cd stress with different water conditions. J Environ Manage. 2018; 206:676-683.
28. Rolli et al. Root-associated bacteria promote grapevine growth: from the laboratory to the field. Plant Soil. 2017; 410(1-2):369-382.
29. Shanta et al. Biochar and plant growth promoting rhizobacteria effects on switchgrass (*Panicum virgatum* cv. Cave-in-Rock) for biomass production in southern Quebec depend on soil type and location. Biomass Bioenergy. 2016; 95:167-173.
30. Smith V. H, Schindler D W. Eutrophication science: where do we go from here? Trends Ecol Evol. 2009; 24(4):201-207.
31. Souza R, Ambrosini A, Passaglia L M P. Plant growth-promoting bacteria as inoculants in agricultural soils. Genet Mol Biol. 2015; 38(4):401-419.
32. Tan et al. Returning biochar to fields: A review. Appl Soil Ecol. 2017; 116:1-11.
33. Vecstaudza et al. Wooden biochar as a carrier for endophytic isolates. Rhizosphere. 2017; 3:126-127.
34. Xiong et al. Enhanced biodegradation of PAHs in historically contaminated soil by *M. gilvum* inoculated biochar. Chemosphere. 2017; 182:316-324.
35. Yan et al. Isolation, Diversity, and Growth-Promoting Activities of Endophytic Bacteria From Tea Cultivars of Zijuan and Yunkang-10. Front Micro. 2018; 9:1848.
36. Yin et al. Effect of biochar and Fe-biochar on Cd and As mobility and transfer in soil-rice system. Chemosphere. 2017; 186:928-937.
37. Zhu et al. Effects and mechanisms of biochar-microbe interactions in soil improvement and pollution remediation: A review. Environ. Pollut. 2017; 227:98-115.
38. Bamdad et al. Study of surface heterogeneity and nitrogen functionalizing of biochars: Molecular modeling approach. Carbon. 2021; 171:161-170.
39. Fu, Shih-Feng et al. "Indole-3-acetic acid: A widespread physiological code in interactions of fungi with other organisms." Plant signaling & behavior vol. 10, 8 (2015): e1048052. doi: 10.1080/15592324.2015.1048052.
40. Berendsen, R. L., Pieterse, C. M., & Bakker, P. A. (2012). The rhizosphere microbiome and plant health. Trends in plant science, 17(8), 478-486.
41. Vessey, J. K. (2003). Plant growth promoting rhizobacteria as biofertilizers. Plant and soil, 255(2), 571-586.
42. Lehmann, J., & Joseph, S. (2015). Biochar for environmental management: an introduction. In Biochar for environmental management, 33-46.
43. Chaney, R. L., Ryan, J. A., Li, Y. M., & Brown, S. L. (1999). Soil cadmium as a threat to human health. In Cadmium in soils and plants, 219-256.
44. Lenton, T. M., & Vaughan, N. E. (2009). The radiative forcing potential of different climate geoengineering options. Atmospheric Chemistry and Physics, 9(15), 5539-5561.
45. Breda, N. J. J. "Leaf area index." (2008): 2148-2154.

The invention claimed is:

1. An isolated bacterial strain of the genus *Fictibacillus* having IDAC Accession number 120121-01.

2. A plant or part thereof inoculated with the bacterial strain of claim 1.

3. A composition comprising (a) an isolated bacterial strain of the genus *Fictibacillus* having IDAC Accession number 120121-01 and (b) an inoculum carrier.

4. The composition of claim 3, wherein the inoculum carrier comprises biochar.

5. The composition of claim 4, wherein the biochar is coarse biochar.

6. The composition of claim 3, further comprising a nutrient medium, optionally wherein the nutrient medium comprises tryptone, sodium chloride and yeast extract.

7. The composition of claim 3, wherein the isolated bacterial strain produces Indole-3-acetic acid, siderophores and/or has nitrogen fixing ability.

8. The composition of claim 3, further comprising at least one additional isolated bacterial strain with plant growth promoting activity.

9. A method of increasing the growth and/or pest resistance of a plant comprising inoculating the plant with
   (a) an isolated bacterial strain of the genus *Fictibacillus* having IDAC Accession number 120121-01, or
   (b) the composition of claim 3, and growing the plant.

10. The method of claim 9, wherein a plant substrate proximate to the plant is inoculated with the isolated bacterial strain or the composition of claim 2, thereby inoculating the plant with the isolated bacterial strain of the genus *Fictibacillus* or the composition.

11. The method of claim 10, wherein the plant substrate proximate to the plant is soil.

12. The method of claim 9, wherein the method further comprises inoculating the plant with at least one additional isolated bacterial strain having plant growth promoting activity.

13. The method of claim 9, wherein increasing plant growth is measured as an increase in one or more of fruit weight, height of plant, height of stalk, fruit yield, ratio of head weight to shoot weight, and increased leaf area, compared to one or more control plants not inoculated with the isolated bacterial strain of the genus *Fictibacillus* or the composition of claim 2.

14. The method of claim 9, wherein the pest resistance is measured as a decrease in pest damage as compared to one or more control plants not inoculated with the isolated bacterial strain of the genus *Fictibacillus* or the composition of claim 2.

15. The method of claim 9, wherein the plant is a crop plant.

16. The method of claim 9, wherein the plant is a fruit or vegetable plant.

17. A kit comprising a first container comprising an inoculum carrier and a second container comprising an isolated bacterial strain of the genus *Fictibacillus* having IDAC Accession number 120121-01.

18. The kit of claim 17, further comprising at least one additional container comprising a nutrient medium, at least one additional isolated bacterial strain with plant growth promoting activity, and/or a plant substrate.

19. The kit of claim 17, wherein the inoculum carrier comprises biochar.

20. The kit of claim 19, wherein the biochar is coarse biochar.

* * * * *